(12) United States Patent
Shimada

(10) Patent No.: US 7,029,129 B2
(45) Date of Patent: Apr. 18, 2006

(54) PROJECTION DISPLAY APPARATUS

(75) Inventor: Naoto Shimada, Tokyo (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 11/092,004

(22) Filed: Mar. 29, 2005

(65) Prior Publication Data

US 2005/0168701 A1 Aug. 4, 2005

Related U.S. Application Data

(63) Continuation of application No. PCT/JP03/12027, filed on Sep. 19, 2003.

(30) Foreign Application Priority Data

Oct. 1, 2002 (JP) .............................. 2002-288936

(51) Int. Cl.
*G03B 21/14* (2006.01)

(52) U.S. Cl. .......................................... 353/94; 353/31

(58) Field of Classification Search ................ 353/31, 353/34, 37, 94, 122; 362/11, 13, 227, 230, 362/231, 236, 238, 800; 349/5, 7, 8, 9; 348/742, 348/743, 771
See application file for complete search history.

(56) References Cited

U.S. PATENT DOCUMENTS

| | | | |
|---|---|---|---|
| 6,053,621 A | 4/2000 | Yoneda | |
| 6,129,437 A | 10/2000 | Koga et al. | |
| 6,188,427 B1* | 2/2001 | Anderson et al. | 347/255 |
| 6,278,419 B1* | 8/2001 | Malkin | 345/31 |
| 6,577,286 B1* | 6/2003 | Jang | 345/31 |
| 6,848,819 B1* | 2/2005 | Arndt et al. | 362/545 |
| 6,899,435 B1* | 5/2005 | Yamanaka | 353/94 |
| 2002/0196377 A1* | 12/2002 | Furukawa et al. | 348/742 |
| 2003/0076057 A1* | 4/2003 | Fleury | 315/291 |
| 2003/0117591 A1* | 6/2003 | Stanton | 353/31 |
| 2005/0062937 A1* | 3/2005 | Imade et al. | 353/31 |

FOREIGN PATENT DOCUMENTS

| | | |
|---|---|---|
| DE | 10030417 A1 | 4/2001 |
| EP | 1211457 A1 | 6/2002 |
| JP | 05-165099 A | 6/1993 |
| JP | 08-220467 | 8/1996 |

(Continued)

OTHER PUBLICATIONS

International Search Report, International Application No. PCT/JP03/12027, 5 pages.

*Primary Examiner*—William C. Dowling
(74) *Attorney, Agent, or Firm*—Volpe and Koenig, P.C.

(57) ABSTRACT

A projection display apparatus comprises luminous bodies, a luminous body driving portion which drives to turn on each of the luminous bodies, light leading members which optically separately lead and project light beams exiting from the luminous bodies, a movable portion which enables relative movement of the light leading members and the luminous bodies, and a light selection control portion which controls the movable portion and/or the luminous body driving portion in such a manner that light beams which enter the light leading members are selected. The apparatus further comprises a light modulation element which performs light modulation, an illumination member which illuminates the light modulation element with light beams from the light leading members, and a display control portion which controls the light selection control portion and the light modulation element in such a manner that the element suitable for light beams from the light leading members is illuminated.

13 Claims, 18 Drawing Sheets

FOREIGN PATENT DOCUMENTS

| | | |
|---|---|---|
| JP | 11-32278 | 2/1999 |
| JP | 11-352589 | 12/1999 |
| JP | 2001-42237 A | 2/2001 |
| JP | 2002-214143 A | 7/2002 |

* cited by examiner

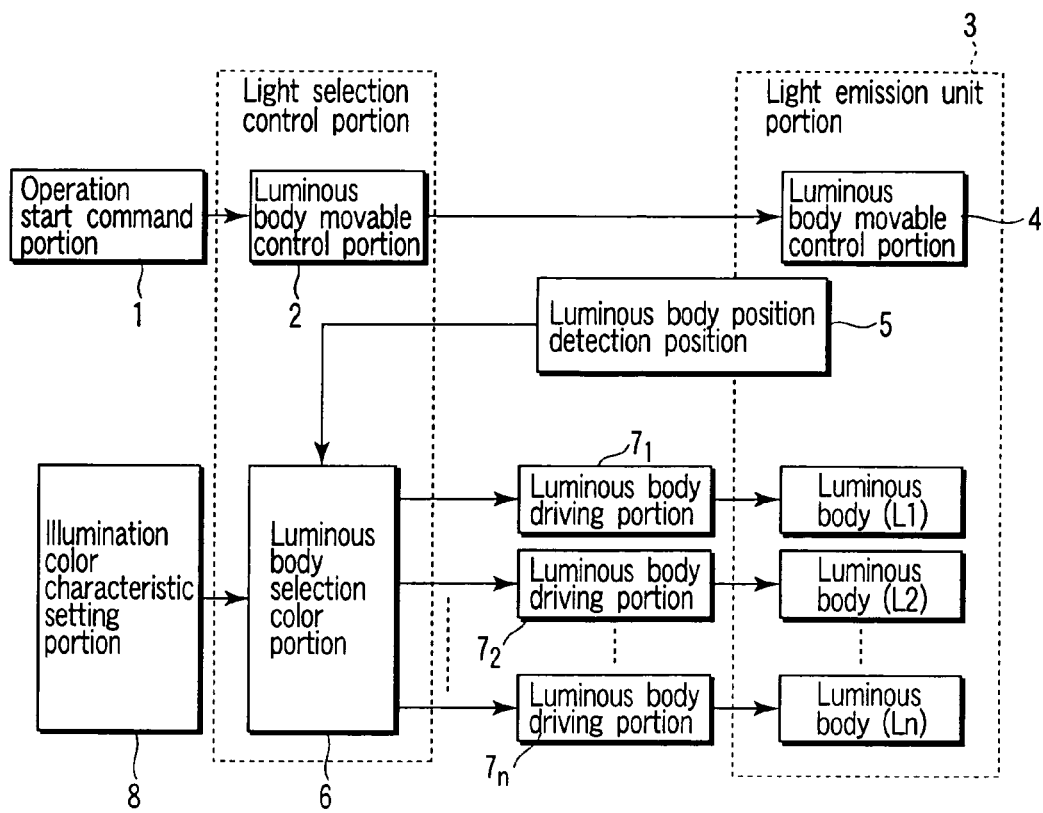
FIG. 1
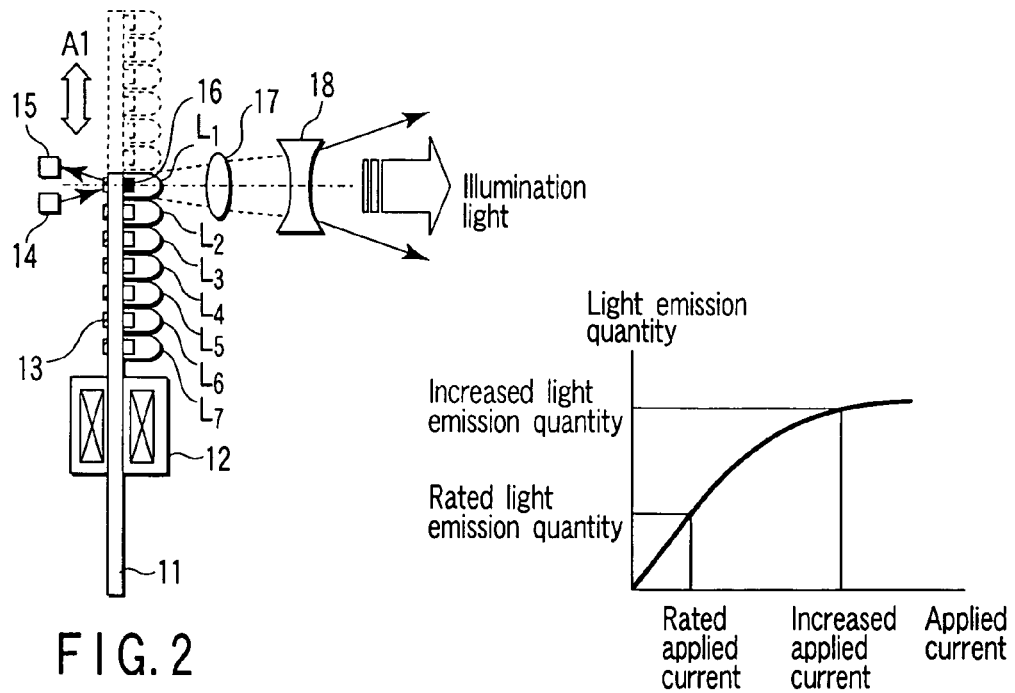
FIG. 2
FIG. 3

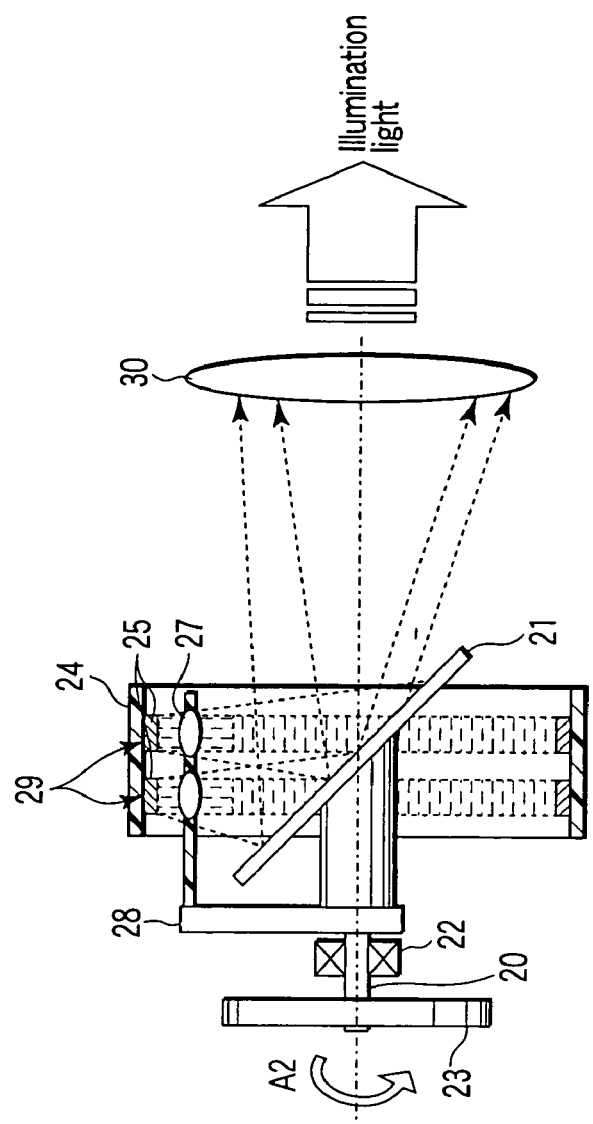
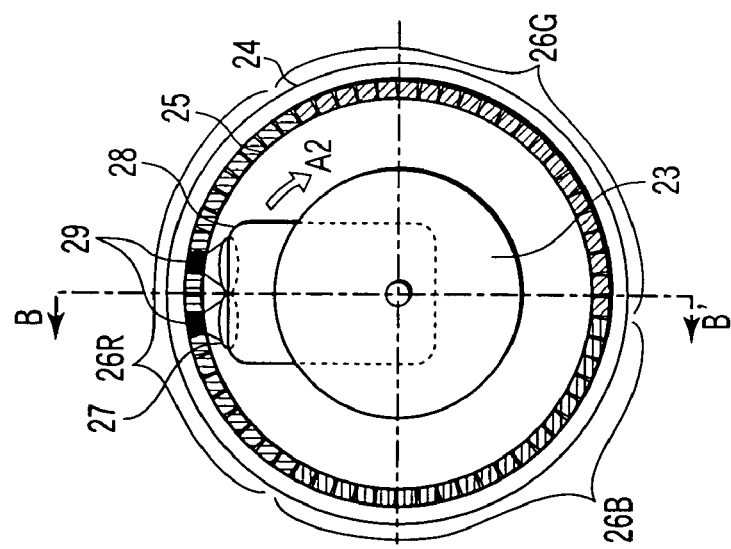
FIG. 5B
FIG. 5A

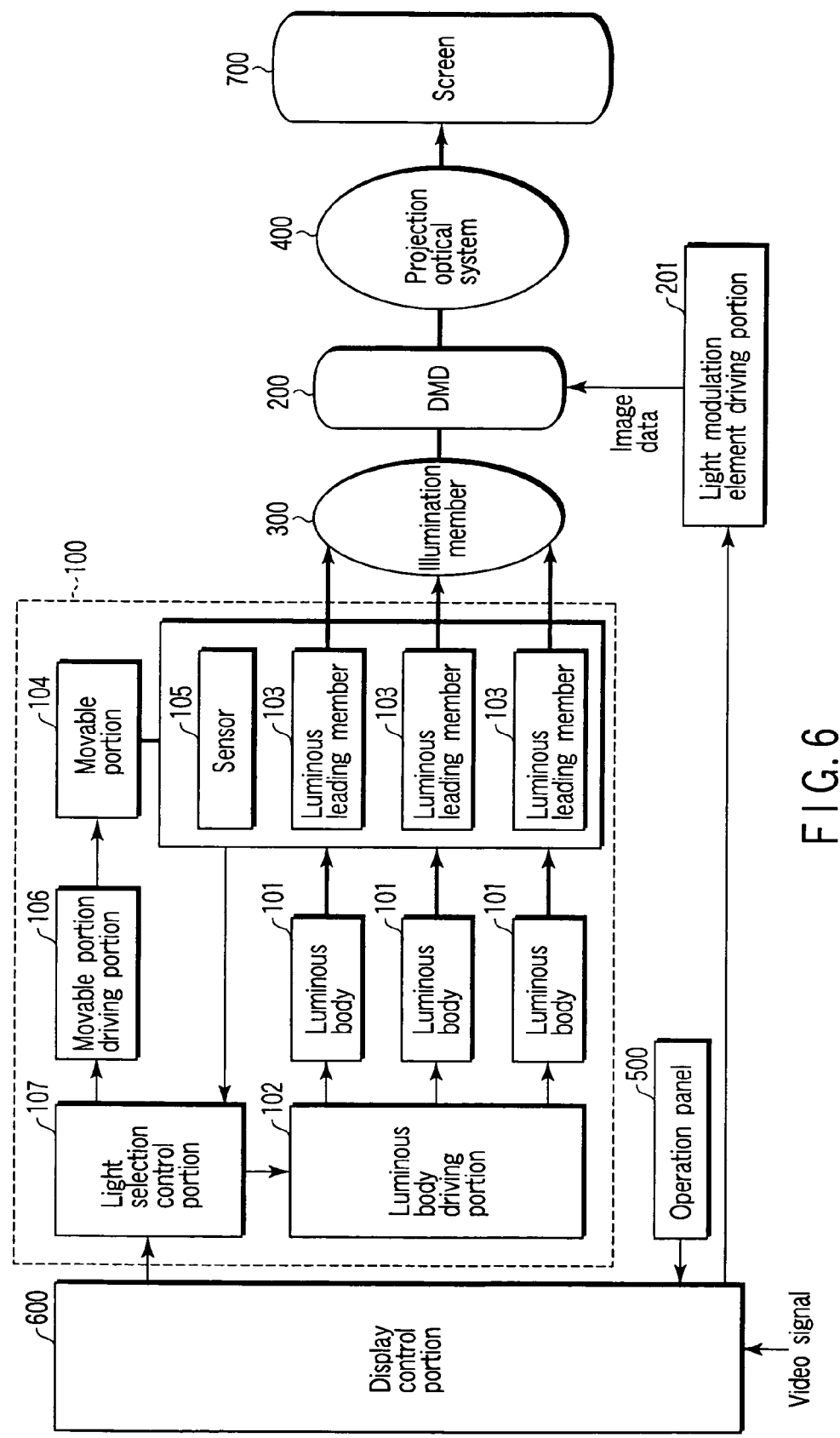
F I G. 6

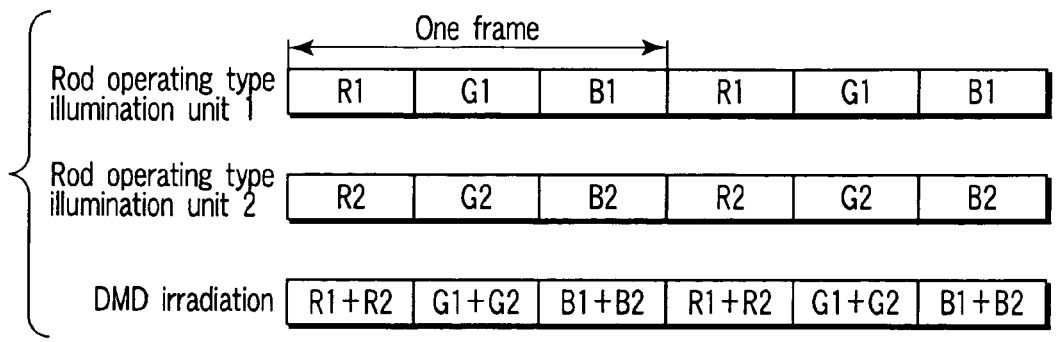
FIG. 14
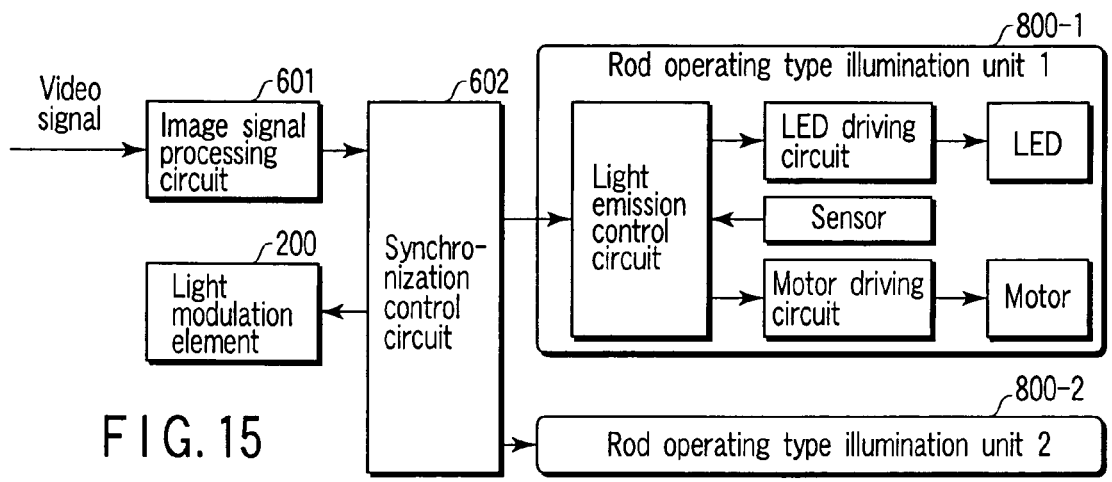
FIG. 15
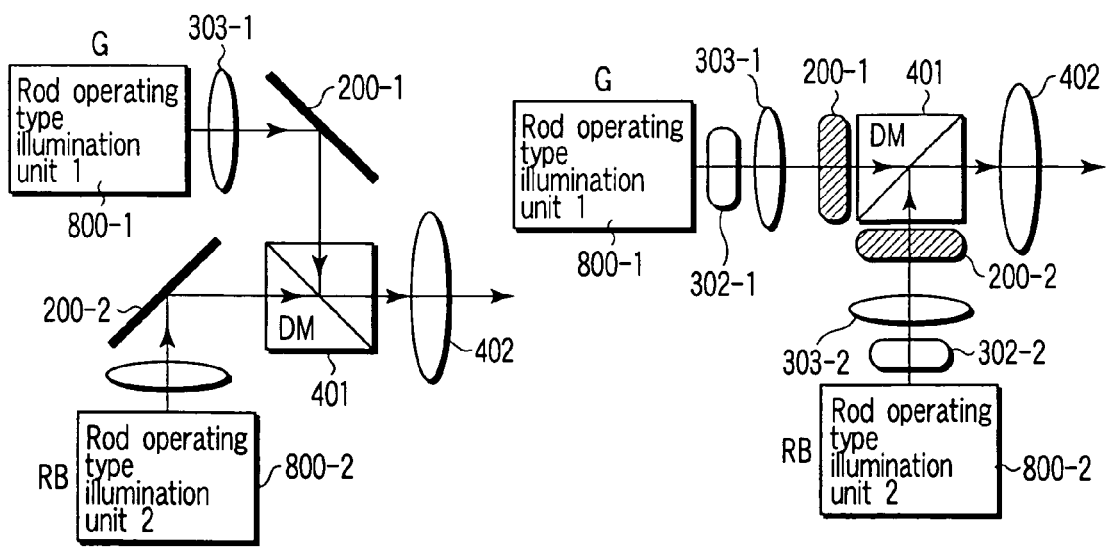
FIG. 16
FIG. 17

PROJECTION DISPLAY APPARATUS

CROSS REFERENCE TO RELATED APPLICATIONS

This is a Continuation Application of PCT Application No. PCT/JP03/12027, filed Sep. 19, 2003, which was published under PCT Article 21(2) in Japanese.

This application is based upon and claims the benefit of priority from prior Japanese Patent Application No. 2002-288936, filed Oct. 1, 2002, the entire contents of which are incorporated herein by reference.

BACKGROUND OF THE INVENTION

1. Field of the Invention

The present invention relates to a projection display apparatus which has a high utilization efficiency of light and realizes high luminance and reduction in size.

2. Description of the Related Art

In examples of a condenser illumination apparatus which illuminates a specified portion with high efficiency have heretofore been known such as a car headlight, stand illumination, spot light, flashlight, and illumination unit for a data projector, light from a light emitting source closer to a point source is reflected by a reflection unit whose reflection shape is devised, directivity of a light flux of the reflected light is enhanced by an optical lens, and the reflected light is usually used to effectively perform condenser illumination.

In the same manner as in conventional illumination, even in these condenser illumination apparatus, there is much demand for obtaining a brighter illumination light without excessively enlarging a size of the apparatus. However, in order to obtain the brighter illumination light, although the size of the condenser illumination apparatus increase, an applied power of the light emitting source is enlarged, thereby to increase quantity of output light. Additionally, in order to enhance a condenser capability, the reflection unit or optical lens is applied which is relatively enlarged with respect to the light emitting source. Therefore, to obtain brightness with good condenser efficiency, the size of the illumination apparatus has to be necessarily enlarged with respect to the light emitting source. In other words, with a small-sized light emitting source which has a high output and which is close to the point source, it is also possible to miniaturize the whole illumination apparatus. From this demand, the miniaturization of the light emitting source of a conventional system has also been advanced, and particularly a small-sized light emitting source by a discharge type from which the high output is possible has been effective means at present. Additionally, even with the light emitting source of the small-sized discharge type, the driving by a high-voltage power source is required in which it is difficult to reduce a circuit scale. There are other many problems with respect to the miniaturization of the total illumination apparatus. It is said that the miniaturization of the illumination apparatus using the light emitting source of the small-sized discharge type has already substantially approached limitation.

On the other hand, a light emitting diode (which will be referred to as a LED hereinafter) is remarkably noted as a next-generation small-sized light emitting source nowadays. The LED has heretofore had advantages such as small size, high durability, and long life, but has restrictions of emission efficiency and emission output. Therefore, the LED has been mainly used as indicator illumination for various instruments or a confirmation lamp of a control stage because of restrictions of emission efficiency and emission output. However, in recent years, the emission efficiency has been rapidly improved, and it is said to be a matter of time before the emission efficiency exceeds that of a high-pressure mercury lamp or fluorescent lamp of the discharge type assumed to have heretofore had highest efficiency. By appearance of the high-efficiency high-brightness LED, the high-output light emitting source by the LED has rapidly been brought into a practical use. In recent years, in addition to red and green, a blue LED has entered a practical-use stage, and this also accelerates the application of the light emitting source. In actual, a plurality of high-efficiency high-brightness LED are used to start the practical use in traffic lights, large-sized full-color displays for outdoors, various car lamps, and backlights of liquid crystal displays in the cellular phones, which has heretofore been impossible in brightness or efficiency.

It is thought that this high-efficiency high-brightness LED is also applied as a promising small-sized light emitting source of the illumination apparatus requiring a condensing property. The LED is originally superior to the other light emitting sources in life, durability, lighting-on speed, and simplicity of a lighting-on/driving circuit. Above all, the blue color is added, three primary colors are obtained as spontaneous-light emitting sources, and an application range of a full-color image display apparatus has therefore been enlarged. Typical examples of the illumination apparatus whose condensing property is demanded include a projector display apparatus in which a display image is formed and projected from image data. The projector display apparatus has heretofore separated desired primary colors from a white-based light emitting source by color filters, and has subjected the image data corresponding to each color to spatial light modulation. When the light obtained by the spatial light modulation is spatially or temporally synthesized, color image display is possible. When the white-based light emitting source is used, only the desired color is separated and used, therefore, the colors other than the separated color are uselessly discarded by the filter in many cases. In this respect, since the LED emits the light of the desired color itself, a necessary quantity of light can be emitted when necessary. As compared with the conventional white-based light emitting source, the light is not wasted, and the light of the light emitting source can be used with good efficiency.

This superior application condition of the LED has been noticed, and, For example, Jpn. Pat. Appln. KOKAI Publication No. 11-32278, No. 11-352589, and the like disclose an example in which the LED is applied to the illumination apparatus for the projector display apparatus. In the technique disclosed in these publications, a plurality of LEDs is disposed to secure a quantity of light. Some of fluxes from the individual light emitting sources is condensed by optical elements such as the optical lens, and the fluxes are controlled so that an image display element as a modulation device to be irradiated is well defined at an allowed incidence angle. For the image display elements such as a liquid crystal device broadly used in general, the allowed incidence angle is small. Therefore, it is supposedly ideal to form the flux having higher parallelism and to irradiate the elements. This is a very important point in enhancing light use efficiency in the image display element.

BRIEF SUMMARY OF THE INVENTION

According to a first aspect of the present invention, there is provided a projection display apparatus comprising:

a plurality of luminous bodies;

a luminous body driving portion configured to drive to turn on each of the plurality of luminous bodies;

a plurality of light leading members configured to optically separately lead and project light beams exiting from the plurality of luminous bodies which are turned on by the luminous body driving portion;

a movable portion configured to enable relative movement of the plurality of light leading members and the luminous bodies;

a light selection control portion configured to control at least one of the movable portion and the luminous body driving portion in such a manner that light beams which enter the plurality of light leading members are selected from light beams of the plurality of luminous bodies;

a light modulation element configured to perform light modulation with respect to light beam entered thereto in accordance with image data;

an illumination member configured to illuminate the light modulation element with light beams exiting from the plurality of light leading members; and a display control portion configured to control the light selection control portion and the light modulation element in such a manner that the light modulation element suitable for light beams exiting from the plurality of light leading members is illuminated with the exiting light beams.

According to a second aspect of the present invention, there is provided a projection display apparatus comprising:

a plurality of luminous bodies;

lighting means for driving to turn on each of the plurality of luminous bodies;

a plurality of light leading means for optically separately leading and projecting light beams exiting from the plurality of luminous bodies which are turned on by the lighting means;

movable means for enabling relative movement of the plurality of light leading means and the luminous bodies;

light selection controlling means for controlling at least one of the movable means and the lighting means in such a manner that light beams which enter the plurality of light leading means are selected from light beams of the plurality of luminous bodies;

a light modulation element which performs light modulation with respect to light beam entered thereto in accordance with image data;

illuminating means for illuminating the light modulation element with light beams exiting from the plurality of light leading means; and display controlling means for controlling the light selection controlling means and the light modulation element in such a manner that the light modulation element suitable for light beams exiting from the plurality of light leading means is illuminated with the exiting light beams.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a function block diagram of an illumination unit in a projection display apparatus according to a first embodiment of the present invention illustrating an illumination principle;

FIG. 2 is a view showing a configuration of a light emission unit portion;

FIG. 3 is a view showing a relationship between an applied current and a light emission quantity of an LED in a modeling graph;

FIG. 5A is a view showing another modification of the light emission unit portion in the first embodiment as seen from a rear surface;

FIG. 5B is a cross-sectional view taken along a line BB' depicted in FIG. 5A;

FIG. 6 is a block diagram showing the projection display apparatus according to the first embodiment;

FIG. 14 is a view showing driving timings of rod operating type illumination units and optical modulation elements;

FIG. 15 is a block diagram showing an electrical control system of the projection display apparatus according to the fourth embodiment;

FIG. 16 is a view showing an optical configuration of a projection display apparatus according to a fifth embodiment of the present invention;

FIG. 17 is a view showing another example of the optical configuration of the projection display apparatus according to the fifth embodiment;

DETAILED DESCRIPTION OF THE INVENTION

First Embodiment

Figure 4:
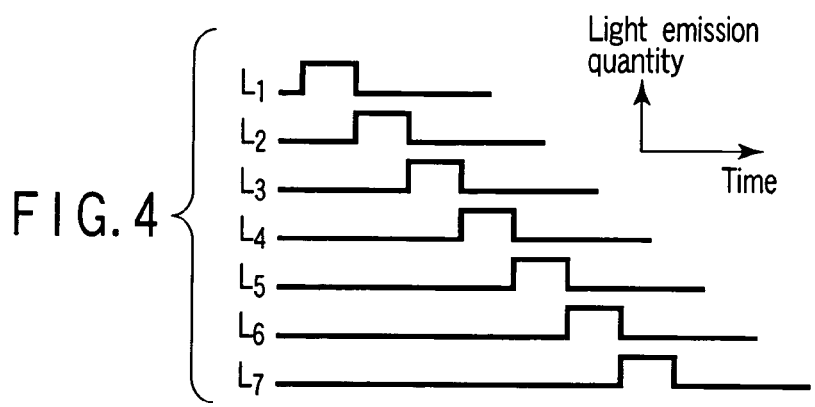
FIG. 4 is a view showing light emission timings of seven LEDs depicted in FIG. 2.

Prior to explaining a first embodiment of a projection display apparatus according to the present invention in detail, a basic illumination principle of an illumination unit in a projection display apparatus according to the first embodiment of the present invention will first be described.

Here, explaining the illumination principle with reference to FIGS. 1 and 2, an illumination target area is brightly illuminated by using: a luminous body driving portion 7 as lighting portions corresponding to lighting means, having a function which adjusts a light emission quantity of luminous bodies, e.g., high-luminance LEDs; optical lenses 17 and 18 as an illumination portion corresponding to illuminating means, which condense light of a lighted luminous body on the illumination target area; a luminous body movable portion 4 as a movable portion corresponding to movable means, e.g., a voice coil motor 12 which causes a support member 11 as a light control member to be operable; and a light selection control portion corresponding to light selection controlling means comprising a luminous body movable control portion 2 which gives a control quantity for moving an LED to a light emission reference position corresponding to the center of a light condensing area of the optical lenses by the movable means and a luminous body selection portion 6 which gives a control quantity to the lighting means so that an LED placed at the luminous body reference position emits light by supplying a single-pulse-like large current to the LED.

An operation start command portion 1 outputs a signal which commands start of an illumination operation by the illumination unit. The output of this operation start command can be engaged with a non-illustrated trigger switch which is operated by a user in order to start illumination. Alternatively, it may be engaged with any other non-illustrated function block which must activate the illumination operation. A signal output from the operation start command portion 1 is input to the luminous body movable control portion 2.

In contrast, a plurality of luminous bodies, e.g., LEDs $L_1$, $L_2$, ..., $L_n$ are arranged in the light emission unit portion 3. These LEDs themselves are mechanisms capable of mechanically moving. The luminous body movable portion 4 is configured in order to drive and move the LEDs. The luminous body movable control portion 2 gives a movement control quantity of each LED to this luminous body movable portion 4. Each LED spatially moves at a high speed by the luminous body movable portion 4 in accordance with the supplied control quantity. As the luminous body movable portion 4, one which can electrically control movement, e.g., an electromagnetic motor, an electrostatic motor or the like is realistic, and selecting appropriate means in accordance with demanded conditions can suffice.

Further, a luminous body position detection portion 5 which constitutes a luminous body position detection sensor which grasps a movement quantity or a movement timing of each LED is additionally provided in the vicinity of the LEDs. This luminous body position detection portion 5 detects an LED which should be caused to emit light by detecting a position of each LED, and outputs a signal corresponding to the detected LED.

A signal output from the luminous body position detection portion 5 is input to the luminous body selection control portion 6. This luminous body selection control portion 6 selects an LED which should emit light based on the input signal. Then, it outputs a control quantity which turns on/off a light emission operation or gives a light emission quantity to the selected LED. The output control quantity is input to a luminous body driving portion selected from luminous body driving portions $7_1, 7_2, \ldots, 7_n$ as lighting means respectively associated with the LEDs $L_1, L_2, \ldots, L_n$ (in this example, n LEDs are provided).

It should me noted that, in regard to a distribution of luminous colors, when the LEDs $L_1, L_2, \ldots, L_n$ can be constituted of LEDs which can emit light having different colors, the visual persistence phenomenon can be used to produce an illumination light in which luminous colors of these LEDs are mixed by setting a speed of movement of the LEDs $L_1, L_2, \ldots, L_n$ by the luminous body movable portion 4 to, e.g., a 1/60 second or below. This perceptible mixed color can be flexibly set by combinations of luminous colors of the respective LEDs or each light emission quantity of the same. Therefore, when a mixed color of an illumination light which is obtained in the illumination color characteristic setting portion 8 is set and information of the set mixed color is supplied to the luminous body selection control portion 6, the luminous body selection control portion 6 can output a control quantity corresponding to this supplied information. As to how to set an illumination color in the illumination color characteristic setting portion 8, it is possible to adopt any one of mechanical means, electrical means, and software means. Furthermore, a content of the setting may be of a direct type such as an illumination color to be obtained or may be of an indirect type such as setting a light emission quantity with respect to the LEDs having different luminous colors. It is to be noted that, as the method of setting a mixed color, a method which controls and changes a light emission time of each LED may be used besides the method which sets a luminous color or a light emission quantity.

That is, according to this embodiment, a plurality of LEDs are configured, these LEDs move at a high speed, LEDs placed at specific positions are caused to emit light like a single pulse, and concatenated different LEDs are continuously caused to emit light at specific positions, thereby obtaining continuous light emission which is apparently equivalent to one LED.

FIG. 2 is a view showing a configuration of an illumination unit when the illumination unit is configured in the simplest manner by using the light emission unit portion 3 described in connection with FIG. 1 based on the illumination principle.

In this example, seven LEDs are used as luminous bodies. That is, the LEDs $L_1$ to $L_7$ are mounted on a support member 11 at equal intervals as shown in the drawing. In this example, each LED has a turret-shaped lens. The support member 11 has a mechanism capable of sliding at high speed in a direction indicated by an arrow A1 in the drawing by a voice coil motor 12 corresponding to the luminous body movable portion 4.

Moreover, seven reflection portions 13 are separately formed on a rear surface of the support member 11 in such a manner that each reflection portion 13 forms a pair with each of the LEDs $L_1$ to $L_7$. These reflection portions 13 as well as a light emission element 14 and a light reception element 15 constitute the luminous body position detection portion 5. That is, these reflection portions 13 reflect light emitted in a predetermined direction from the light emission element 14, and fixedly arranged to be capable of receiving light by using the light reception element 15. Additionally, when the reflection portion 13 arrives a predetermined light emission reference position 16 as shown in the drawing, a reflected light is input from this position to the light reception element 15. Therefore, it is possible to detect whether an LED which forms a pair with the reflection portion exists at the light emission reference position by counting the number of times of reflection from the reflection portion on the initial stage. It is to be noted that the light emission reference position 16 is determined as a position where the LED $L_1$ is placed in the illustrated state.

An optical lens 17 which condenses an emitted light and an optical lens 18 which controls an optical path so that the light condensed by the optical lens 17 can be applied to a desired irradiation target area are constituted on a light emission front surface of an LED placed at the light emission reference position 16. That is, when the support member 11 moves and an LED passes the light emission reference position 16, the passing LED alone emits light and the irradiation target area is irradiated with the emitted light. When this operation is sequentially repeated with respect to the LEDs $L_1$ to $L_7$, it is possible to obtain an illumination light in which light beams emitted from the LEDs $L_1$ to $L_7$ are apparently substantially continuous in a given time although in a time sharing manner.

As shown in FIG. 3, a quantity of light emitted from the LED can also be increased by increasing an applied current although there is a predetermined allowable limit. The allowable limit is of course affected and determined by characteristics of a material used, a composition defect, heat radiation performances, electric conduction characteristics of peripheral electrodes and others. However, by particularly increasing heat radiation performances in the same LED, a current which is equal to or higher than a rated applied current in continuous light emission can be supplied, thereby obtaining a large light quantity.

In order to increase heat radiation properties, a method of radiating heat in a shorter time by enhancing heat conduction properties around the LEDs is taken for granted, and light emission with heat generation being suppressed is enabled by assuring a long non-light-emission time by pulse light emission in a very short time rather than continuous light emission. That is, observing in a light emission time only, light emission can be performed while increasing the brightness to be higher than that in continuous light emission by applying a larger quantity of a current in a very short time. An intensive light which cannot be obtained in continuous light emission can be produced by utilizing such characteristics and using the illumination principle like this embodiment.

It is to be noted that although the LEDs $L_1$ to $L_7$ move with respect to the optical lenses 17 and 18 in this above description, the optical lenses 17 and 18 may move relatively with respective to the LEDs $L_1$ to $L_7$, and it is needless to say that the same advantages can be obtained even if such a configuration is adopted.

FIG. 4 is a timing chart showing light emission timings of the LEDs $L_1$ to $L_7$ described in connection with FIG. 2. The horizontal axis represents time, and the vertical axis represents the light emission quantity. As apparent from FIG. 4, the respective LEDs $L_1$ to $L_7$ are subjected to time sharing, and a light emission control is effected in such a manner that the LEDs $L_1$ to $L_7$ are continuous.

It is to be noted that the optical configuration which obtains an illumination light can be likewise taken when one rod lens substitutes for the optical lenses 17 and 18.

Further, the optical lenses 17 and 18 may be arranged at positions apart from the LEDs by arranging a rod member as light leading means (a light leading member) which leads and projects light from each LED to the optical lens 17 in front of the optical lens 17.

As shown in FIGS. 5A and 5B, still another modification of the light emission unit portion 3 in this embodiment adopts a configuration in which a plane reflection mirror 21 as a light control member coupled with a rotary shaft 20 is integrated. The rotary shaft 20 is supported by a rotary shaft bearing 22 and coupled with a driving motor 23. The plane reflection mirror 21 can rotate at a high speed in a direction indicated by an arrow A2 in the drawing by this driving motor 23.

In contrast, a drum-shaped drum support member 24 is fixed and formed with the rotary shaft 20 being used as a common central axis as shown in the drawing, and LEDs 25 as luminous bodies form two stages and are closely arranged along a side surface on the inner side of the drum support member 24. It is to be noted that different luminous colors of the respective LEDs 25 are represented by giving different hatchings in FIG. 5A (and hence, the hatchings do not represent a cross section), and FIG. 5B shows LED sequences 26R, 26G and 26B instead of each LED 25, in which the same color is continuously arranged, a circumference is divided in accordance with each set color (indicated by a hatching of a different broken line) and luminous colors are switched in the order of a red (R) color, a green (G) color and a blue (B) color in a process of one rotation.

Furthermore, two sets of condenser lenses 27 are supported by a rotary support member 28 integrated with the rotary shaft 20 so that the condenser lenses 27 can rotate and move in cooperation with the plane reflection mirror 21. It is to be noted that the number of stages on which the LEDs 25 are arranged is basically the same as the number of sets of the condenser lenses 27, but the number is not restricted thereto, and setting an appropriate number according to needs can suffice.

In such a configuration, an illumination light which can generate field images of three primary colors which are required for a color image of one frame can be obtained with respect to one rotation of the plane reflection mirror 21. That is, the LEDs 25 arranged on the drum support member 24 sequentially repeat light emission in a time sharing manner, and perform chain light emission in such a manner that the LEDs go around on the side surface on the inner periphery (light emission points 29 go around). In this case, when the plane reflection mirror 21 performs a rotation operation, light emission control is effected in such a manner that LEDs 25 which have a correspondence relationship with the plane reflection mirror 21 emit light in synchronization with this rotation operation. That is, there is formed a configuration relationship in which light beams emitted from the LEDs 25 are reflected and condensed by the plane reflection mirror 21, and then projected to an irradiation target area through the optical lens 30.

That is, when the plane reflection mirror 21 performs the rotation operation, there is carried out a light emission control in such a manner that the LEDs 25 which have a correspondence relationship with the plane reflection mirror 21 emit light in synchronization with this rotation operation. However, the condenser lens 27 is provided in an arrangement relationship with which light from the light emitting LEDs 25 can be excellently acquired. That is, there is formed a configuration relationship in which light beams from the light emitting LEDs 25 are once condensed by the condenser lens 27, and the condensed light is reflected by the plane reflection mirror 21 so that its optical path is inflected and projected to an irradiation target area through the optical lens 30.

As the first embodiment of the present invention, the description has been given on the basic principle that the plurality of LEDs $L_1$ to $L_n$ or 25 are constituted, these LEDs move at a high speed or the plane reflection mirror 21 and the condenser lens 27 rotate and move at a high speed, the LEDs placed at specific positions (the light emission reference position 16 or the light emission points 29) are caused to emit light like single pulses and the linked different LEDs are continuously caused to emit light, thereby obtaining continuous light emission which is apparently equivalent to one LED.

In particular, although the description has been given as to the illumination unit which brightly illuminates an irradiation target area with a condensed light or a parallel light, such an illumination unit can be also utilized for so-called flash illumination which is illumination of an imaging apparatus. Moreover, the description has been given on the example of illumination in a predetermined short time in order to simplify the explanation in this embodiment, but the present invention is not restricted thereto, and it can be also applied to an illumination unit such as a torch light which performs continuous illumination.

A projection display apparatus according to the first embodiment of the present invention comprises one illumination unit 100, and one light modulation element 200 which performs light modulation with respect to light from the illumination unit 100 in accordance with image data.

The illumination unit 100 has: a plurality of luminous bodies 101 such as LEDs; a luminous body driving portion 102 as a lighting portion corresponding to lighting means which drives to turn on each of the plurality of luminous bodies 101; light leading members 103 corresponding to a plurality of light leading means which separately optically lead and project light exiting from the plurality of luminous bodies 101 which are turned on by the luminous body driving means 102; a movable portion 104 corresponding to movable means which enables relative movement of the plurality of light leading members 103 and the luminous bodies 101; a sensor 105 which detects a relative movement quantity or a positional relationship of the plurality of light leading members 103 and the luminous bodies 101 realized by the movable portion 104; a movable means driving portion 106 which drives the movable portion 104 in such a manner that light which enters the plurality of light leading members 103 is selected from light from the plurality of luminous bodies 101; and/or a light selection control portion 107 corresponding to light selection controlling means which controls the luminous body driving portion 102.

It is to be noted that the luminous bodies 101 in this example correspond to the luminous bodies $L_1$ to $L_7$ and the LEDs 25. The luminous body driving portion 102 corresponds to the luminous body driving portions $7_1$ to $7_n$. The light leading member 103 corresponds to the plane reflection mirror 21. Additionally, as this light leading member 103, it is possible to utilize a solid glass rod member, a hollow light pipe whose inner surface is a light reflection film, or the like in accordance with an actual mechanical configuration of the illumination unit 100. The movable portion 104 corresponds to the luminous body movable portion 4, the voice coil motor 12 or the driving motor 23. The sensor 105 corresponds to the luminous body position detection portion 5 or the light emission element 14 and the light reception element 15. The light selection control portion 107 corresponds to the light selection controlling means comprising the luminous body control portion 2 and the luminous body selection control portion 6.

Further, the light modulation element 200 is a transmission type LCD or a reflection type LCD or a two-dimensional micromirror deflection array which is known as a trademark DMD (a digital micromirror device). Since the DMD is disclosed in, e.g., U.S. Pat. No. 6,129,437, its detailed explanation will be eliminated.

The projection display apparatus according to this embodiment further comprises an illumination member 300 corresponding to illuminating means, a projection optical system 400, an operation panel 500, a display control portion 600 corresponding to display controlling means, and a light modulation element driving portion 201.

In this example, the illumination member 300 evenly illuminates the predetermined light modulation element 200 with light exiting from the plurality of light leading members 103, and corresponds to the optical lenses 17, 18 and 30. Furthermore, this may have a configuration which divides or combines a light flux by using a dichroic mirror (which will be referred to as a DM hereinafter) or combines light fluxes by using a polarizing beam splitter (which will be referred to as a PBS hereinafter) in accordance with actual mechanical structure and arrangement of each portion in the projection display apparatus.

Moreover, the projection optical system 400 performs expansion and projection of an image of the light modulation element 200. That is, by displaying an image in the light modulation element 200, e.g., a transmission type LCD, the displayed image can be expanded and projected on a screen 700 by using the projection optical system 400. This projection optical system 400 may be an optical lens only or an optical system including a device which combines light fluxes by using a DM in accordance with actual mechanical structure and arrangement of each portion in the projection display apparatus.

The operation panel 500 is a panel on which operation buttons and others are arranged which instruct start/end of operations for projection and display with respect to the display control portion 600.

The display control portion 600 performs data conversion (color information and a display rate) of an input video signal in response to an operation start command from the operation panel 500. Additionally, it controls driving timings of the light selection control portion 107 and the light modulation element driving portion 201 which drives the light modulation element 200 in accordance with resulting image data in such a manner a color light which can be appropriately controlled by the light modulation element 200 can be applied.

It is to be noted that projection and display of a color video are enabled by using a plurality of types (e.g., three types R, G and B) of luminous bodies which emit different luminous colors as the luminous bodies 101 and driving the light modulation element 200 based on image data having colors according to the types of the luminous bodies 101 which emit light. That is, in this case, the display control portion 600 controls the light selection control portion 107 in such a manner that light beams having different colors exit from the illumination unit 100 in time series, and drives the light modulation element 200 by using the light modulation element driving portion 201 at a rate which is several-fold of a frame rate of an input color video signal, thereby projecting and displaying each color in one frame in a time sharing manner.

According to the projection display apparatus having such a configuration, by causing each luminous body 101 to instantaneously emit an intensive light for a predetermined period, it is possible to obtain a large quantity of light while reducing a load of each luminous body 101 itself which suppresses heat generation itself and has excellent heat radiation properties, and obtain an apparently continuous very bright illumination light by sequential execution of the operation of the different luminous bodies 101 in a chain manner by moving the luminous bodies 101 themselves or light leading areas of the light leading members 103 at a high speed. That is, it is possible to constitute the projection display apparatus using the illumination unit 100 which is effectively intended to efficiently produce a light flux having the high light condensing properties or parallelism which cannot be realized by a method which simply arranges many luminous bodies 101 such as LEDs and brings in a light quantity by simultaneously lighting the luminous bodies 101.

Further, a color projection display apparatus having a wide color reproduction area is configured by using a plurality of types of luminous bodies 101 which emit different luminous colors.

Figure 7:
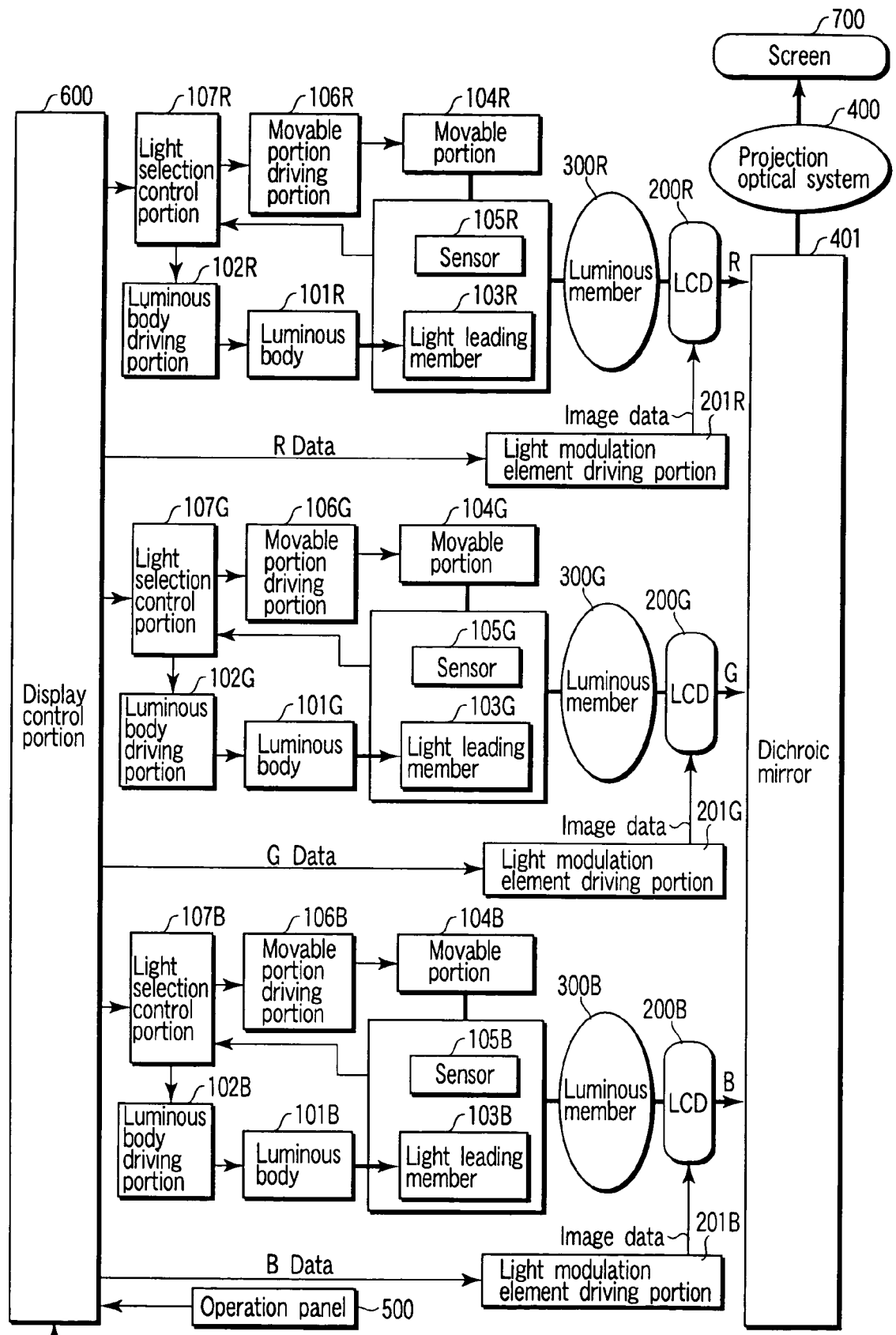
FIG. 7 is a view showing a modification of the projection display apparatus according to the first embodiment.

A modification of the projection display apparatus according to the first embodiment has, as shown in FIG. 7, individual illumination units 101 for each of R, G and B. That is, this modification comprises three illumination units 100 and three light modulation elements 200R, 200G and 200B. Even though one light leading member is included in each illumination unit 100, the entire projection display apparatus has a plurality of light leading members 103R, 103G and 103B.

In this modification, an illumination unit 100 having the configuration depicted in FIG. 6, an illumination member 300, a light modulation element 200 and a light modulation element driving portion 201 are provided in accordance with each color as indicated by giving R, G and B to reference numerals of the respective portions, and this modification is the same as the projection display apparatus according to the first embodiment shown in FIG. 6 except that these constituent parts are controlled in accordance with image data of each color (data R, data G and data B) obtained when a display control portion 600 processes an input color video signal, thereby eliminating the explanation of this modification.

In this case, however, the three light modulation elements 200R, 200G and 200B can perform expansion and projection of images on a screen 700 in one projection optical system 400 by arranging a DM 401 between each light modulation element 200 (which is shown as an LCD in FIG. 7) and the projection optical system 400.

It is to be noted that the plurality of luminous bodies 101 and light leading members 103 may be of course provided in one illumination unit 100. In such a case, such a timing control as shown in FIG. 4 is executed with respect to the plurality of luminous bodies 101 in each illumination unit 100.

Second Embodiment

Figure 8B:
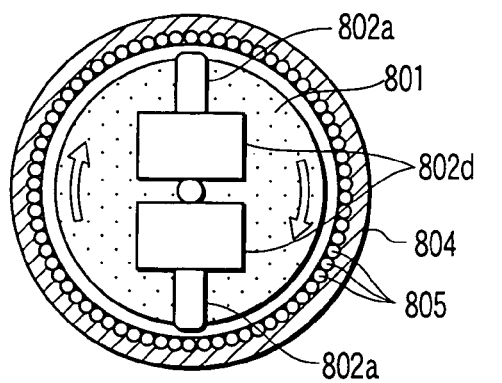
FIG. 8B is a right-hand side view of the rod operating type illumination unit which is used in the projection display apparatus according to the second embodiment.
Figure 9:
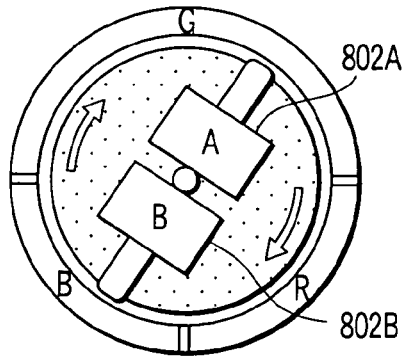
FIG. 9 is a view showing a relationship between an arrangement of LEDs and light leading rod members in a projection display apparatus according to a third embodiment of the present invention.
Figure 8A:
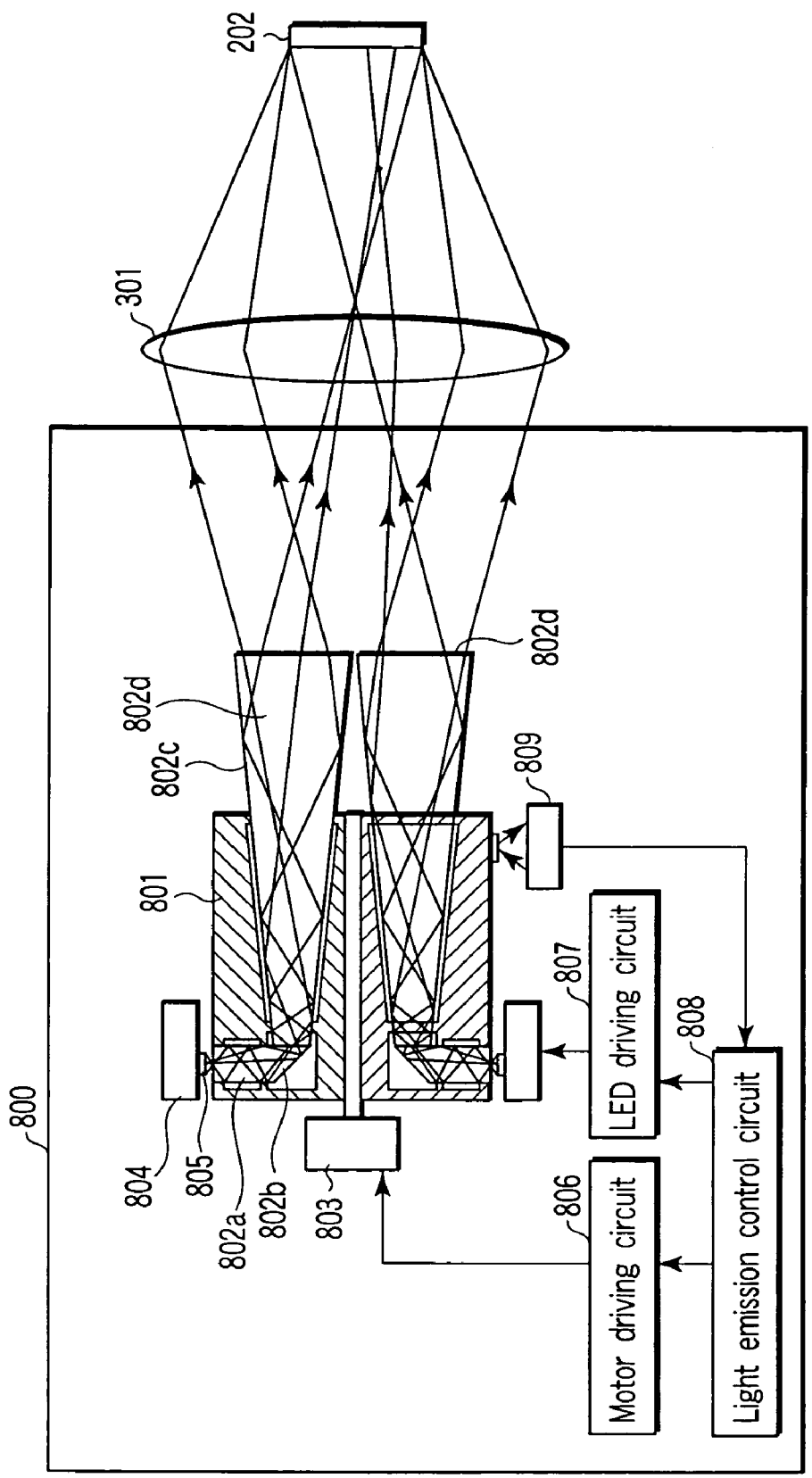
FIG. 8A is a cross-sectional view showing a configuration of a rod operating type illumination unit which is used in a projection display apparatus according to a second embodiment of the present invention.

A second embodiment according to the present invention will now be described. As shown in FIGS. 8A and 8B, a rod operating type illumination unit 800 used in the projection display apparatus according to this second embodiment has a plurality of luminous bodies and light leading members corresponding to light leading means integrally configured, and comprises a plurality of illumination units each of which outputs light exiting therefrom in a predetermined direction.

That is, in this rod operating type illumination unit 800, two polygonal light leading rod members 802 constituted of L-shaped optical surfaces attached to a rod holder 801 as a holding tool capable of swiveling are rotated by a motor 803 as a movable portion corresponding to movable means. Further, one or two of LEDs 805 as a plurality of luminous bodies arranged on an inner periphery of an LED substrate 804 formed into a drum-like shape are sequentially turned on with respect to each light leading rod member 802 in accordance with rotation of the light leading rod members 802. It is to be noted that the light leading rod member 802 has a polygonal shape because the LED 805 has a rectangular shape and hence the efficiency can be increased if the shape of the light leading rod member 802 is close to the rectangular shape and losses generated when bending into an L shape can be suppressed to the minimum level. Furthermore, the L-shaped light leading rod member 802 may be manufactured by integral molding, or it may be formed by boding three components, i.e., a prismatic parallel rod 802a, a reflection prism 802b which has a reflection coat applied thereon and used for optical path inflection and a tapered rod 802c.

Moreover, a projection end surface 802d of the light leading rod member 802 is determined as a virtual light source, and a Koehler illumination optical system which forms an optical pupil on a display device 202 as a light modulation element by a superimposition lens 301 as an illumination member corresponding to illuminating means is constituted.

The motor 803 is driven by a motor driving circuit 806 as a movable portion driving portion, and each LED 805 is driven by an LED driving circuit 807 as a luminous body driving portion. The motor driving circuit 806 and the LED driving circuit 807 are controlled by a light emission control circuit 808 as a light selection control portion corresponding to light selection controlling means. In this case, the light emission control circuit 808 controls a light emission timing of each LED 805 based on rotation position detection of the rod holder 801 by a rotation sensor 809.

By sequentially switching the plurality of LEDs 805 for pulse light emission and selecting and changing a relative position relationship with the light leading rod members 802 which fetch radiated light in accordance with light emission switching of the LEDs 805, the LEDs which has an effectively high luminance can be obtained, and light having a large light quantity and an improved parallelism can be obtained from the light leading rod members 802.

It is to be noted that a relative position of each LED 805 and each light leading rod member 802 is changed by rotating the light leading rod members 802 in this configuration, but this change in relative position can be also realized by moving the LEDs 805. However, moving the light leading rod member 802 is more preferable because of the reliability in view of supply of a power to the LEDs 805. In this case, since unevenness in a light intensity distribution in, e.g., a projection end surface 802D of the light leading rod member 802 is small when the light leading rod member 802 has a length to some extent, this projection end surface 802d can be regarded as a virtual rectangular surface light source with the high evenness. Therefore, the critical illumination may be performed with a conjugate relationship achieved between the display device 202 as an irradiation target and the projection end surface 802d of the light leading rod member 802. However, in such critical illumination, if the plurality of light leading rod members 802 is provided like this configuration, a rim portion of the projection end surface 802d of each light leading member 802 is projected and illuminated by the irradiation target, which results in illumination irregularities. Since the light leading rod members actually rotate, an illumination area has a circular shape, and the rim portion cannot be visually recognized depending on a rotational speed. However, the rim portion of the rod projection end surface 802d has illumination irregularities at a given moment, the illumination irregularities change in the area every second, and the critical illumination cannot be applied to the display device 202 which performs gradation display in a time sharing manner. On the contrary, like this configuration, in case of Koehler illumination which converts an angular intensity distribution of a light flux exiting from each light leading rod member 802 into a positional intensity distribution in an illumination area, even if each light leading rod member 802 is shifted, an angular intensity distribution of a light flux exiting from each light leading rod member 802 is not changed, thereby realizing an illumination unit having small illumination irregularities in an illumination area.

Therefore, since bright illumination with small illumination irregularities is enabled by configuring the projection display apparatus using such a rod operating type illumination unit 800, a bright video without irregularities can be projected and displayed.

Third Embodiment

A third embodiment according to the present invention will now be described. The third embodiment performs projection and display of a color video by using a rod operating type illumination unit 800 which projects colored light beams which are different in time series from two light leading rod members 802, and two light modulation elements 200.

That is, in this embodiment, in the rod operating type illumination unit 800, as the plurality of LEDs 805 arranged on the inner periphery of the LED substrate 804 formed into a drum shape such as shown in FIG. 8A, LEDs having a green (G) luminous color are arranged at a part corresponding to an approximately ½ periphery, LEDs having a red (R) luminous color are arranged at a part corresponding to an approximately ¼ periphery, and LEDs having a blue (B) luminous color are arranged at a part corresponding to approximately ¼ periphery. By adopting such an arrangement of the LEDs 805, since one of the two light leading rod members "A" 802A and "B" 802B is placed at a position of the LEDs having the luminous color G even if these light leading rod members "A" 802A and "B" 802B are rotated by a motor 803, light G always exits from the rod operating type unit 800. On the contrary, light R and light B are switched and projected every ¼ rotation of the light leading rod members "A" 802A and "B" 802B. Therefore, the two colors always exit from the rod operating type unit 800.

Figure 10:
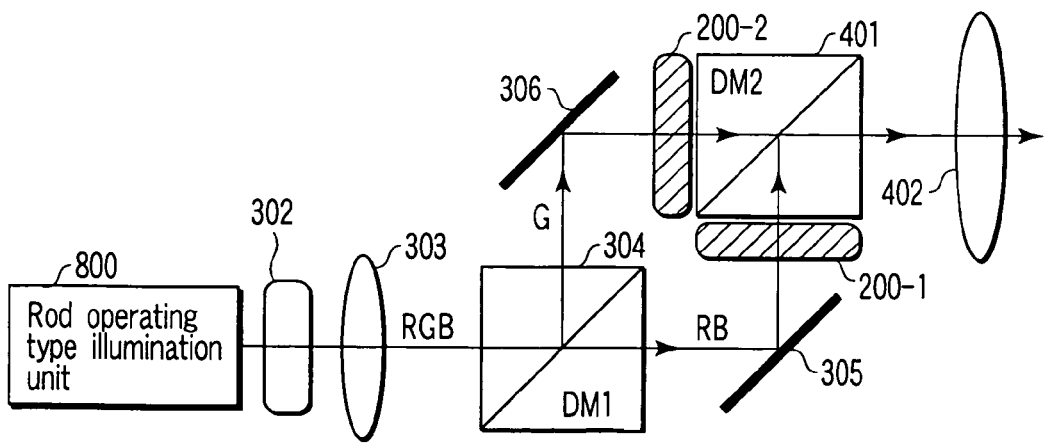
FIG. 10 is a view showing an optical configuration of the projection display apparatus according to the third embodiment.

As shown in FIG. 10, a polarizing direction of light exiting from such a rod operating type illumination unit 800 is converted by a polarization conversion element 302. This polarization conversion element 302 divides a natural light into two polarizing directions, converts polarization in such a manner that one polarizing direction matches with the other polarizing direction, thereby efficiently converting polarization into one polarizing direction. It is to be noted that this polarization conversion element 302 is required since an LCD is used as the light modulation element 200 in this embodiment, and it is not required when a DMD is used as the light modulation element 200.

Light whose polarizing direction has been converted by such a polarization conversion element 302 is caused to enter a DM "1" 304 through a lens 303. As this DM "1" 304, a dichroic mirror which transmits light having a wavelength of light R and light B therethrough and reflects light having a wavelength of light G thereon is used. Thus, the light R and the light B transmitted through this DM "1" 304 are reflected by a mirror 305, and applied to a first light modulation element (a transmission type LCD "1" in this embodiment) 200-1. Further, the light G reflected on the DM "1" 304 is reflected by a mirror 306, and applied to a second light modulation element (a transmission type LCD "2" in this embodiment) 200-2.

The light beams transmitted through these light modulation elements 200-1 and 200-2 enter a DM "2" 401. As this DM "2" 401, a dichroic mirror which reflects light having a wavelength of the light R and the light B thereon and transmits light having a wavelength of the light G therethrough is used. Thus, the light R or the light B from the first light modulation element 200-1 is combined with the light G from the second light modulation element 200-2 by this DM "2" 401, and the combined light is led to a projection lens 402.

Figure 11:
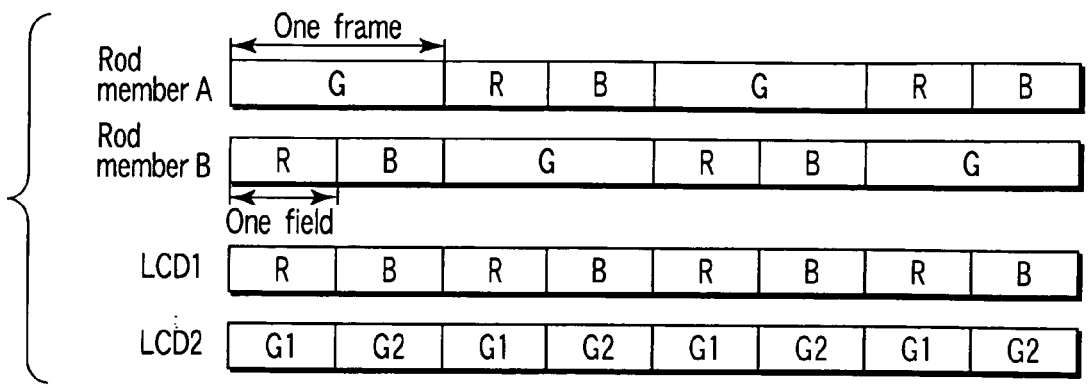
FIG. 11 is a view showing a relationship between positions of the light leading rod members and driving timings of light modulation elements.

A relationship between a position of each light leading rod member and a driving timing of each light modulation element is as shown in FIG. 11. In this example, one frame means one screen display period of an input video signal, and one frame is composed of two fields. The first light modulation element (the transmission type LCD "1") 200-1 and the second light modulation element (the transmission type LCD "2") 200-2 are both driven at double speed, perform display of one RG image or BG image in one field, and can effect RGB color display in one frame. In this case, as to G, the same data is displayed twice.

Figure 12:
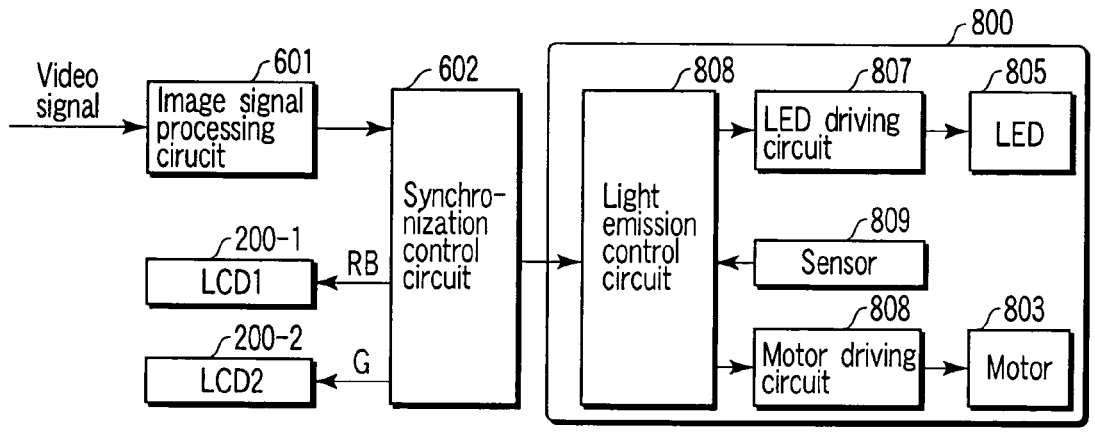
FIG. 12 is a block diagram of an electrical control system of the projection display apparatus according to the third embodiment.

A configuration of an electrical control system of the projection display apparatus according to the third embodiment is as shown in FIG. 12. That is, the projection display apparatus according to this embodiment comprises an image signal processing circuit 601 and a synchronization control circuit 602 as a display control portion corresponding to display controlling means. In this example, the image signal processing circuit 601 performs data conversion (color information and a display rate) of an input video signal. The synchronization control circuit 602 displays image data of a result of this conversion in the light modulation elements 200-1 and 200-2 with such timings as shown in FIG. 11. In addition to this, the synchronization control circuit 602 supplies a synchronization signal to a light emission control circuit 808 so that the rod operating type illumination unit 800 operates with this display timings as shown in FIG. 11.

As described above, the color projection display apparatus compatible with the RGB color video signal can be constituted.

Fourth Embodiment

Figure 13:
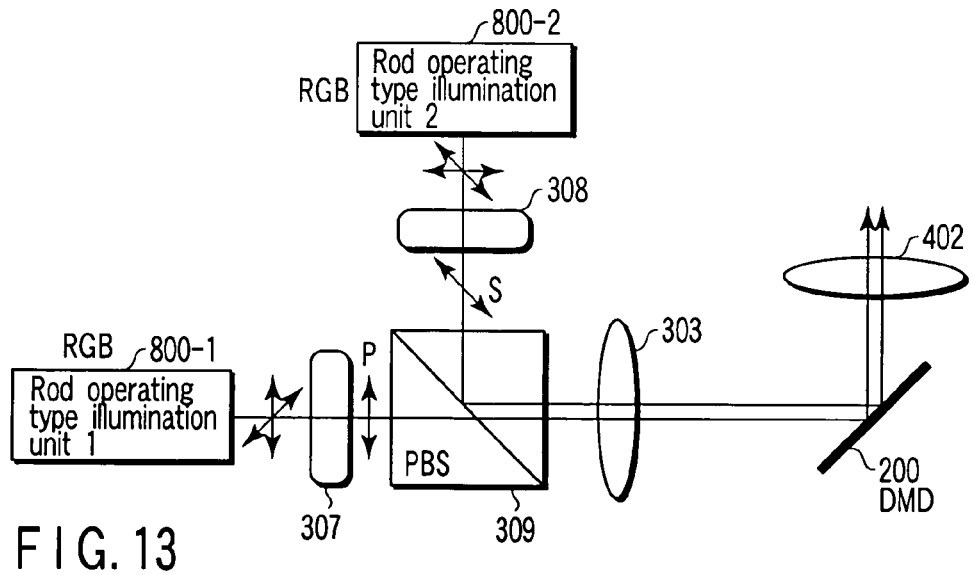
FIG. 13 is a view showing an optical configuration of a projection display apparatus according to a fourth embodiment of the present invention.

A fourth embodiment according to the present invention will now be described. As shown in FIG. 13, a projection display apparatus according to the fourth embodiment has two rod operating type illumination units (a rod operating type illumination unit "1" 800-1 and a rod operating type illumination unit "2" 800-2). In this example, the rod operating type illumination units 800-1 and 800-2 are configured to project light R, light G and light B in time series in one frame as shown in FIG. 14.

Furthermore, polarizing directions of the light R, light G and light B exiting from the first rod operating type illumination unit (the rod operating type illumination unit "1") 800-1 are equalized in a direction P by a polarization conversion element 307, whilst polarizing directions of the light R, light G and light B exiting from the second rod operating type illumination unit (the rod operating type illumination unit "2") 800-2 are equalized in a direction S by a polarization conversion element 308, and the respective light beams enter a PBS 309. As this PBS 309, a polarizing beam splitter which transmits light having the direction P as a polarizing direction therethrough and reflects light having the direction S as a polarizing direction is adopted. Thus, the PBS 309 combines the light beams from the two rod operating type illumination units 800-1 and 800-2.

Moreover, the light modulation element (the DMD in this embodiment) 200 is irradiated with this combined light through a lens 303, and the light modulated by this light modulation element 200 is led to a projection lens 402. It is to be noted that, when an LCD is used as the light modulation element 200, a polarization conversion element must be further arranged between the PBS 309 and the lens 3023 in order to convert polarization of the combined light.

With such a configuration, a light quantity of the light with which the light modulation element 200 is irradiated is increased, thereby enabling brighter projection display.

Incidentally, in this case, as shown in FIG. 14, field sequential color display is carried out by matching rotational speeds and phases of the two light leading rod members and further synchronizing image data so that the two rod operating type illumination units 800-1 and 800-2 emit light having the same color. In order to realize this, in regard to an image signal processing circuit 601 and a synchronization control circuit 602 shown in FIG. 15, the image signal processing circuit 601 is provided with a function which converts an input color video signal into a field sequential color video signal and the synchronization control circuit 602 is provided with a function which matches phases of the two rod operating type illumination units 800-1 and 800-2 in addition to the functions of the third embodiment.

It is to be noted that FIG. 15 does not show a configuration of the second rod operating illumination unit (the rod operating type illumination unit "2") 800-2, and the illustration of this configuration is eliminated because this configuration is the same as that of the first rod operating type illumination unit (the rod operating type illumination unit "1") 800-1 (this is also applied to a block diagram of an electrical control system used in the explanation of each of the following embodiments).

Fifth Embodiment

A description will now be given as to a projection display apparatus according to a fifth embodiment of the present invention which comprises two rod operating type illumination units and two light modulation elements.

Figure 18:
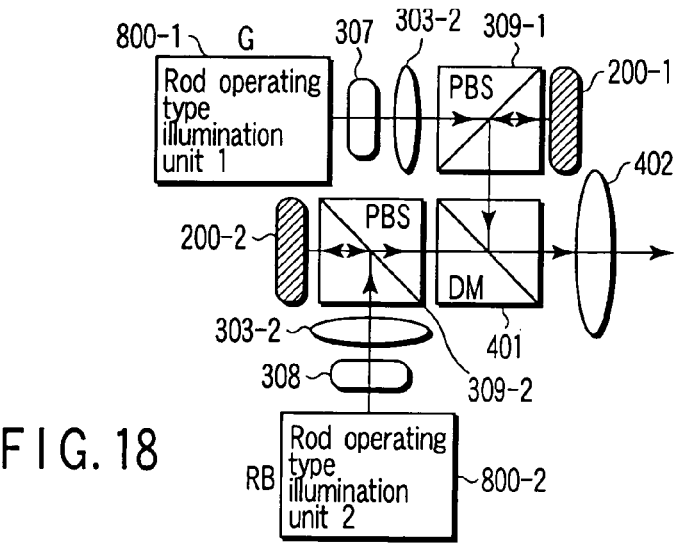
FIG. 18 is a view showing still another example of the optical configuration of the projection display apparatus according to the fifth embodiment.
Figure 19:
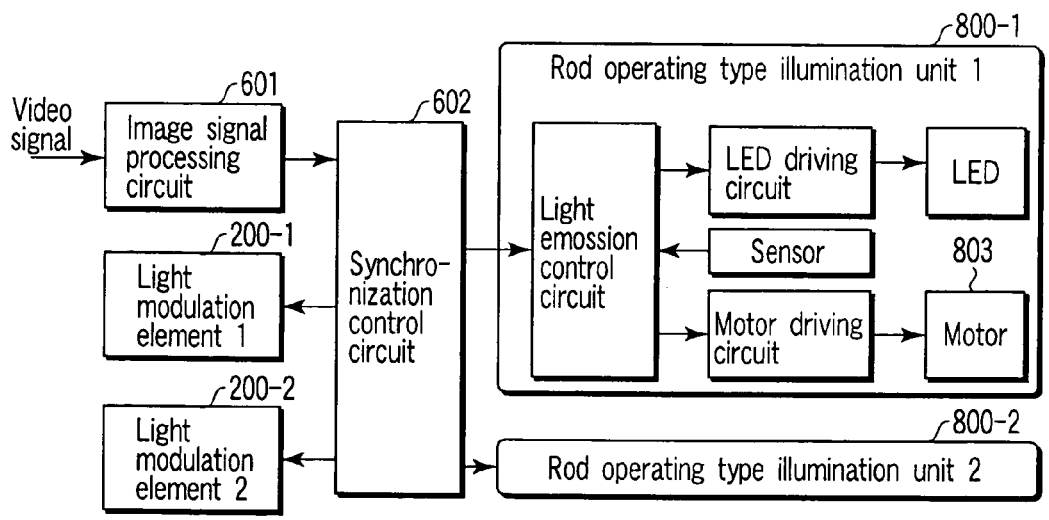
FIG. 19 is a block diagram showing an electrical control system of the projection display apparatus according to the fifth embodiment.

FIGS. 16 to 18 are views showing an optical configuration of the projection display apparatus according to the fifth embodiment. Additionally, FIG. 19 is a block diagram of an electrical control system of the projection display apparatus according to this embodiment, and FIG. 20 shows a timing chart of light emission of LEDs and driving of light modulation elements.

Figure 20:
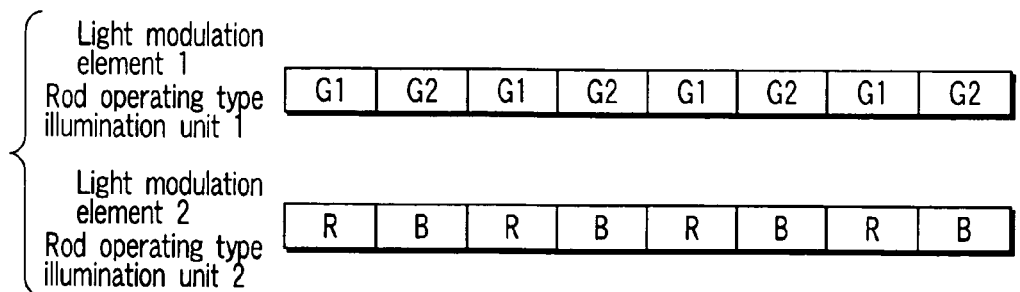
FIG. 20 is a view showing timings of light emission of LEDs and driving of light modulation elements.

That is, in the configuration shown in FIG. 16, the first rod operating type illumination unit (the rod operating type illumination unit "1") 800-1 is configured to always emit light G as shown in FIG. 20. A first light modulation element (a DMD "1") 200-1 is irradiated with the light G exiting from this first rod operating type illumination unit 800-1 through a lens 303-1. In contrast, a second rod operating type illumination unit (a rod operating type illumination unit "2") 800-2 is configured to emit light R and light B in time series as shown in FIG. 20. A second light modulation element (a DMD "2") 200-2 is irradiated with light R and light B exiting from this second rod operating type illumination unit 800-2 through a lens 303-2. Further, the light beams modulated by the first and second light modulation elements 200-1 and 200-2 are combined by a DM 401 and led to a projection lens 402.

Furthermore, in the configuration shown in FIG. 17, light G exiting from a first rod operating illumination unit (a rod operating type illumination unit "1") 800-1 configured to always emit the light G is likewise applied to a first light modulation element (an LCD "1") 200-1 through a polarization conversion element 302-1 and a lens 303-1. Moreover, light R and light B exiting from a second rod operating type illumination unit (a rod operating type illumination unit "2") 800-2 configured to emit the light R and the light B in time series are likewise applied to a second light modulation element (an LCD "2") 200-2 through a polarization conversion element 302-2 and a lens 303-2. Moreover, the light beams modulated by the first and second light modulation elements 200-1 and 200-2 are combined by a DM 401 and led to a projection lens 402.

Additionally, in the configuration shown in FIG. 18, a polarizing direction of light G exiting from a first rod operating type illumination unit (a rod operating type illumination unit "1") 800-1 configured to always emit the light G is uniformed into a direction P by a polarization conversion element 307, then the light G enters a PBS 309-1 through a lens 303-1, is transmitted through the PBS 309-1 and applied to a first light modulation element (a reflection type LCD (which will be referred to as an LCOS hereinafter) "1") 200-1. Further, the light G which has been modulated by this first light modulation element 200-1 and whose polarizing direction has been converted into a direction S is reflected by the PBS 309-1 and enters a DM 401. Furthermore, likewise, polarizing directions of light R and light B exiting from a second rod operating type illumination unit (a rod operating type illumination unit "2") 800-2 configured to emit the light R and the light B in time series are uniformed into a direction S by a polarization conversion element 308, then these light beams enter a PBS 309-2 through a lens 303-2, are reflected by the PBS 309-2 and applied to a second light modulation element (an LCOS "2") 200-2. Furthermore, the light R and the light B which have been modulated by this second light modulation element 200-2 and whose polarizing directions have been converted into a direction P are transmitted through the PBS 309-2, and enter the DM 401. Thus, the light beams modulated by the first and second light modulation elements 200-1 and 200-2 are combined by the DM 401 and led to a projection lens 402.

In the configurations shown in FIGS. 16 to 18, the second rod operating type illumination unit 800-2 which performs time-series illumination of the light R and the light B must be synchronized with image data. On the contrary, although it is preferable that the first rod operating type illumination unit 800-2 for the light G is synchronized with image data, but it may not be synchronized with it. Moreover, the light modulation elements 200-1 and 200-2 are both driven at a double speed, but matching driving times improves the efficiency of the circuits.

It is to be noted that each of the first and second rod operating type illumination units 800-1 and 800-2 comprises a motor 803 in the configuration shown in FIG. 19, but each unit may not comprise this motor. In this case, it is sufficient to provide an interlocking mechanism such as a belt drive which rotates the both light leading rod members to one motor, for example.

Additionally, although the LEDs for G which is a color whose light emission quantity should be aboundingly utilized are always turned on taking the color balance into consideration so that a combined light in one frame period has a desired white color, LEDs for R or B may be always turned on depending on characteristics of LEDs used in some cases.

Sixth Embodiment

A projection display apparatus according to a sixth embodiment of the present invention will now be described. This embodiment obtains brighter illumination by simultaneously illuminating one light modulation element by two illumination units driven by luminous bodies having slightly different wavelengths.

Figure 21:
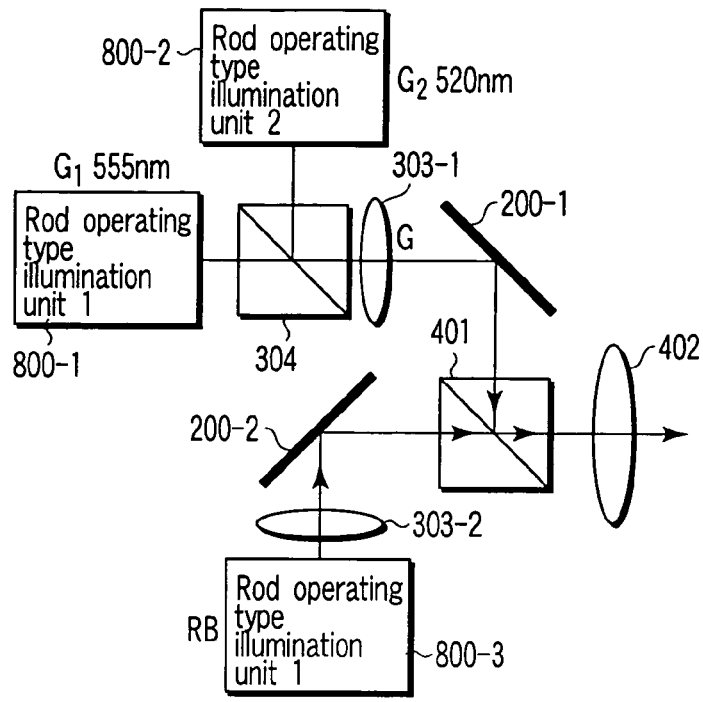
FIG. 21 is a view showing an optical configuration of a projection display apparatus according to a sixth embodiment of the present invention.
Figure 22:
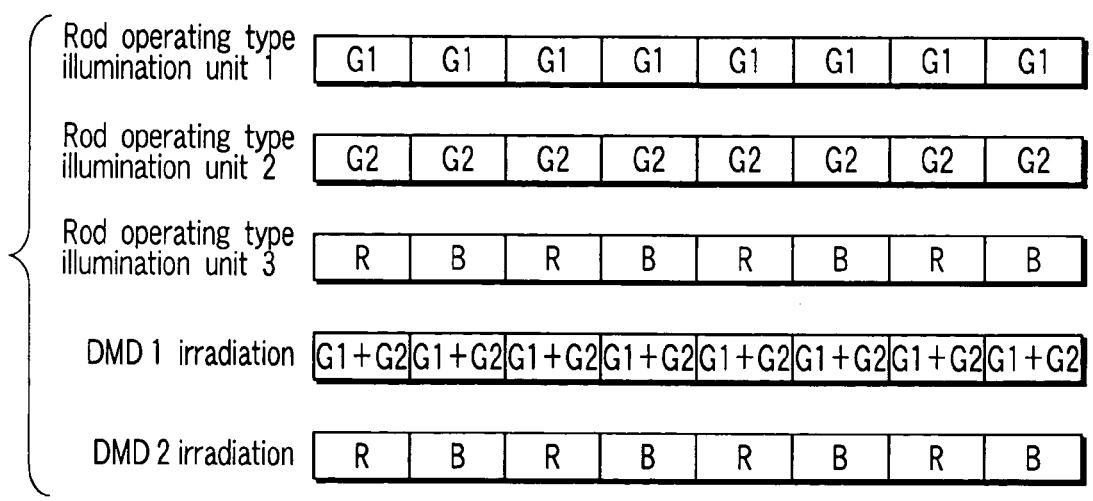
FIG. 22 is a view showing driving timings of rod operating type illumination units and light modulation elements.

That is, in the projection display apparatus according to this embodiment, as shown in FIG. 21, a first rod operating type illumination unit (a rod operating type illumination unit "1") 800-1 is configured to always emit a green (G1) light having a wavelength of, e.g., 555 nm as shown in FIG. 22. The light G1 exiting from this first rod operating type illumination unit 800-1 enters a DM "1" 304. Further, a second rod operating type illumination unit (a rod operating type illumination unit "2") 800-2 is configured to always emit a green (G2) light having a wavelength of, e.g., 520 nm as shown in FIG. 22. The light G2 exiting from this second rod operating type illumination unit 800-2 also enters the DM "1" 304.

Figure 23A:
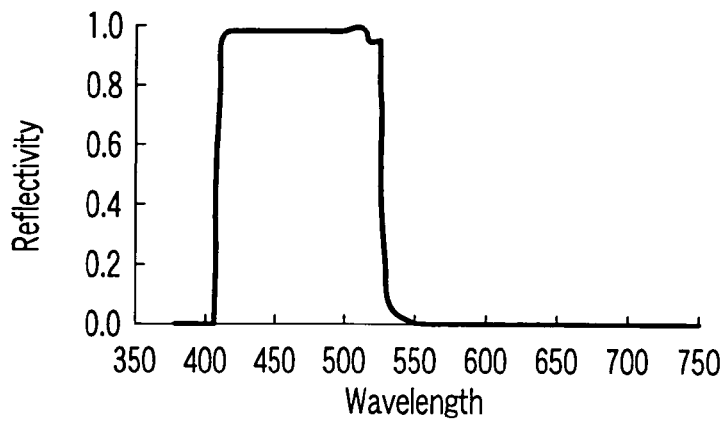
FIG. 23A is a view showing spectral characteristics of a DM "1" depicted in FIG. 21.

In this example, spectral characteristics of the DM "1" 304 perform reflection/transmission with a wavelength of approximately 530 nm on the boundary as shown in FIG. 23A. Thus, the light G1 with the wavelength of 555 nm exiting from the first rod operating type illumination unit 800-1 is transmitted, and the light G2 with the wavelength of 520 nm exiting from the second rod operating type illumination unit 800-2 is reflected, thereby combining the both exiting light. Furthermore, as shown in FIG. 22, a first light modulation element (a DMD "1") 200-1 is irradiated with the combined light G (G1+G2) through a lens 303-1.

Moreover, a third rod operating type illumination unit (a rod operating type illumination unit "3") 800-3 is configured to emit light R and light B in time series as shown in FIG. 22. The light R and the light B exiting from the third rod operating type illumination unit 800-3 are applied to a second light modulation element (a DMD "2") 200-2 through a lens 303-2 as shown in FIG. 22.

Figure 23B:
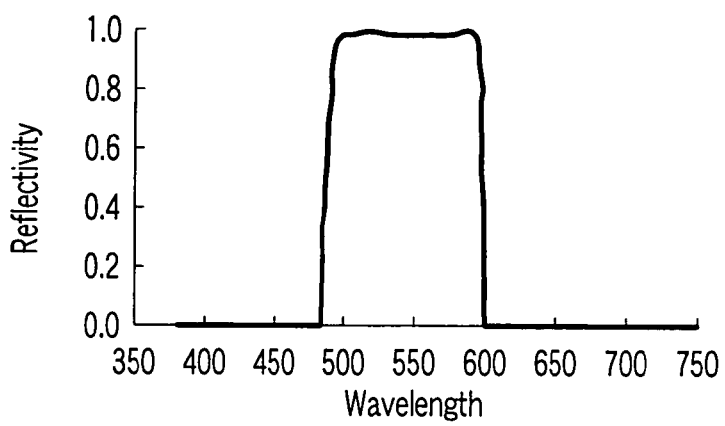
FIG. 23B is a view showing spectral characteristics of a DM "2" depicted in FIG. 21.

Additionally, the light modulated by the first and second light modulation elements 200-1 and 200-2 enter a DM "2" 401. Spectral characteristics of this DM "2" 401 reflect light having a wavelength of approximately 500 nm to approximately 590 nm, i.e., light in an area G as shown in FIG. 23B. Thus, the modulated light G from the first light modulation element 200-1 is reflected, and the modulated light R and B from the second light modulation element 200-1 are transmitted, thereby combining these light. The combined light is led to a projection lens 402.

In this case, like the foregoing embodiments, the three rod operating type illumination units 800-1, 800-2 an 800-3 and the two light modulation units 200-1 and 200-2 are of course synchronously driven by a synchronization control circuit.

It is to be noted that the present invention is not restricted to the example where one color alone is used in the two illumination units as described above, and a light quantity can be increased by using two colors or three colors in the two illumination units.

Figure 24:
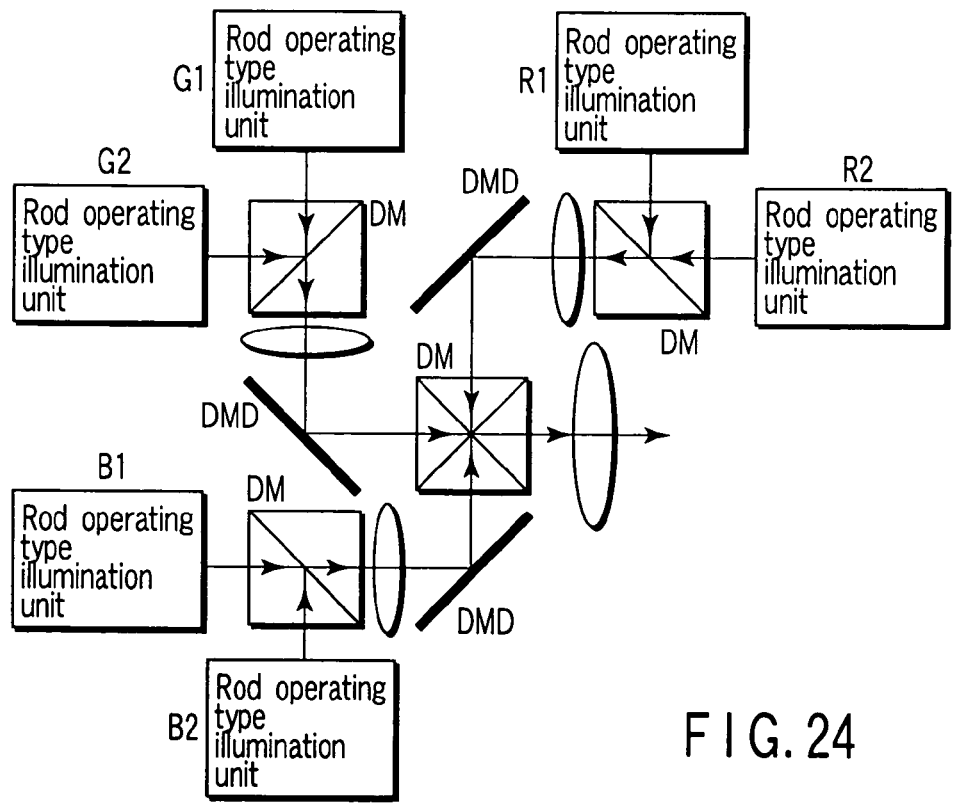
FIG. 24 is a view showing an optical configuration of a modification of the projection display apparatus according to the sixth embodiment.

For example, an optical configuration of a projection display apparatus when three colors are used in the two illumination units is as shown in FIG. 24.

Seventh Embodiment

Figure 25:
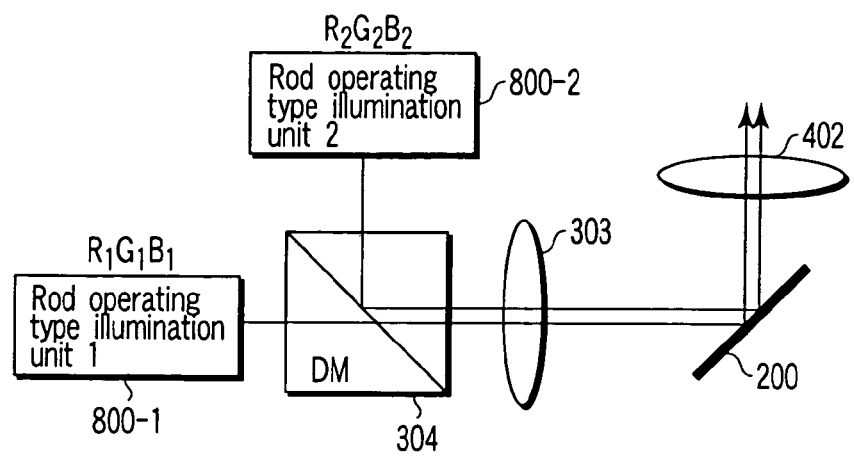
FIG. 25 is a view showing an optical configuration of a projection display apparatus according to a seventh embodiment of the present invention.
Figure 26:
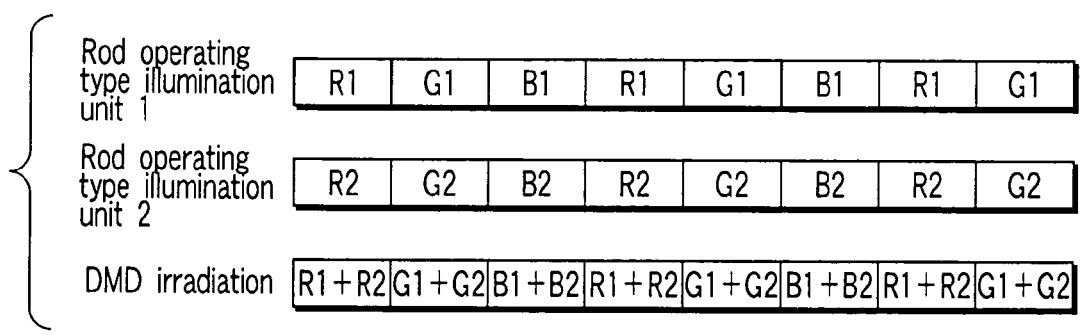
FIG. 26 is a view showing driving timings of rod operating type illumination units and light modulation elements.

A projection display apparatus according to a seventh embodiment according to the present invention will now be described. That is, as shown in FIG. 25, the projection display apparatus according to this embodiment has two rod operating type illumination units (a rod operating type illumination unit "1" 800-1 and a rod operating type illumination unit "2" 800-2). In this example, each of the rod operating type illumination units 800-1 and 800-2 is configured to emit light R, light G and light B in time series in one frame as shown in FIG. 26. In this case, wavelengths of R, G and B are different from each other. That is, a wavelength of the light R (R1) of the first rod operating type illumination unit 800-1 is 610 nm, a wavelength of the light G (G1) of the same is 520 nm, and a wavelength of the light B (B1) of the same is 470 nm. Furthermore, a wavelength of the light R (R2) of the second rod operating type illumination unit 800-2 is 645 nm, a wavelength of the light G (G2) of the same is 555 nm, and a wavelength of the light B (B2) of the same is 450 nm.

Figure 27:
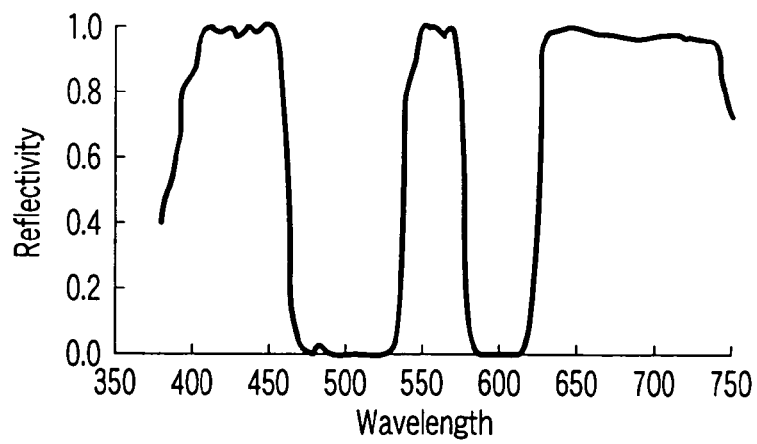
FIG. 27 is a view showing spectral characteristics of a DM depicted in FIG. 25.

Moreover, the light R, light G and light B exiting from these first and second rod operating type illumination units 800-1 and 800-2 respectively enter a DM 304. In this example, as shown in FIG. 27, the spectral characteristics of the DM 304 have three reflection bands respectively corresponding to the wavelength of the light R, light G and light B exiting from the second rod operating type illumination unit 800-2. Thus, the DM 604 combines the light beams from the two rod operating type illumination units 800-1 and 800-2, a light modulation element (a DMD in this embodiment) 200 is irradiated with this combined light through a lens 303, and the light modulated by this light modulation element 200 is led to a projection lens 402. In this case, the two rod operating type illumination units 800-1 and 800-2 and the light modulation element 200 operate in synchronization with each other.

Figure 28:
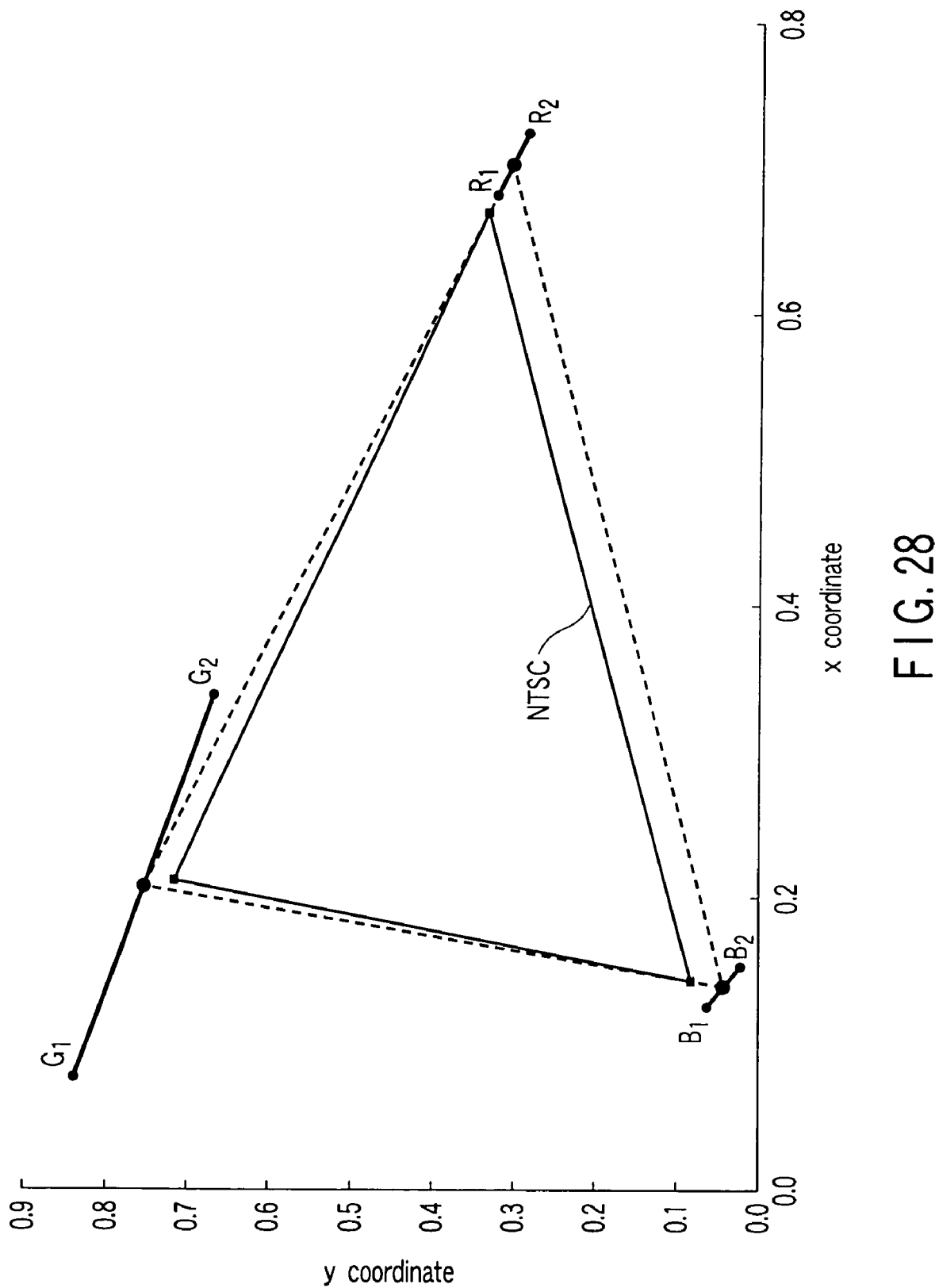
FIG. 28 is a chromaticity diagram showing a chromaticity coordinate of an LED of each color used in each rod operating type illumination unit, a color coordinate combined for each color and an area of a color which can be reproduced.

A chromaticity coordinate of an LED of each color used in each rod operating type illumination unit, a color coordinate combined in accordance with each color and an area of a color which can be reproduced have such a relationship as shown in FIG. 28.

In this example, the color coordinate combined in accordance with each color corresponds to each point (a point indicated by a large black circle) on a line segment connecting two color coordinates (points indicated by small black circles) of a corresponding color, and the area of a color which can be reproduced by a color light in which three colors are combined corresponds to an area surrounded by a broken line connecting these points.

When an input color video signal is an NTSC signal, it is desirable to use an LED which can reproduce a color light corresponding to points indicated by a square in the drawing. However, such an LED is rare, or a bright LED hardly exists. Thus, in this embodiment, an adjustment is carried out so that a desirable color can be obtained by examining wavelengths of two types of LEDs which are used for respective colors.

Additionally, a subtle error which cannot be processed by such an adjustment for the LED to be adopted can be adjusted by converting a video signal itself. That is, when a color of a reference light source is different from a color of an illumination light when forming a video signal, a reproduced color differs. Accordingly, color information of an input video signal is converted so that correct color reproduction can be carried out with a color of an illumination light.

Figure 29:
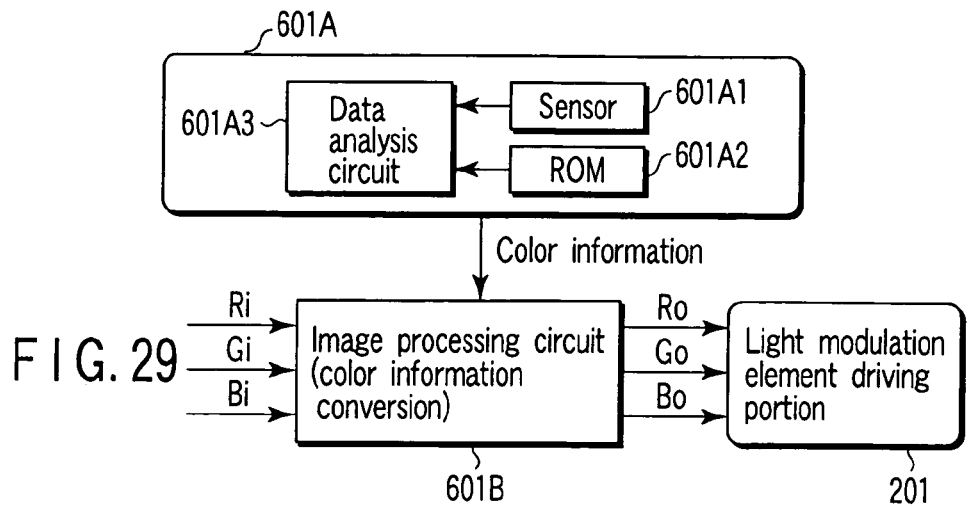
FIG. 29 is a view showing a configuration of an image signal processing circuit for color information conversion.

FIG. 29 is a view showing a configuration of an image signal processing circuit 601 which performs such color information conversion. That is, this image signal processing circuit 601 comprises a luminous color analysis circuit 601A and an image processing circuit 601B, and the luminous color analysis circuit 601A includes a sensor 601A1, an ROM 601A2 and a data analysis circuit 601A3.

Here, the sensor 601A1 monitors a current luminous color (a wavelength or an intensity). The ROM 601A2 stores initial correction data, and a conversion table of the correction data according to a monitoring result obtained by the sensor 601A1. That is, a luminous color of each LED varies with time, and also varies depending on a temperature. Therefore, the initial correction data alone is insufficient. The data analysis circuit 601A3 converts the initial correction data stored in the ROM 601A2 in accordance with a monitoring result obtained by the sensor 601A1 by using the conversion table, and supplies the conversion result to the image processing circuit 601B.

Further, the image processing circuit 601B carries out color information conversion with respect to input color video signals (Ri, Gi and Bi) in accordance with correction color information from the luminous color analysis circuit 601A, and supplies controls signals Ro, Go and Bo of respective colors according to the conversion result to the light modulation element driving portion 201. As a result, appropriate color reproduction can be performed in a video to be projected even if an irradiation color has irregularities in accordance with each projection display apparatus.

Eighth Embodiment

A projection display apparatus according to an eighth embodiment of the present invention will now be described. The projection display apparatus according to this embodiment arranges an illumination unit which applies light of a single color and a light modulation element in accordance with each of the three colors R, G and B.

Figure 30:
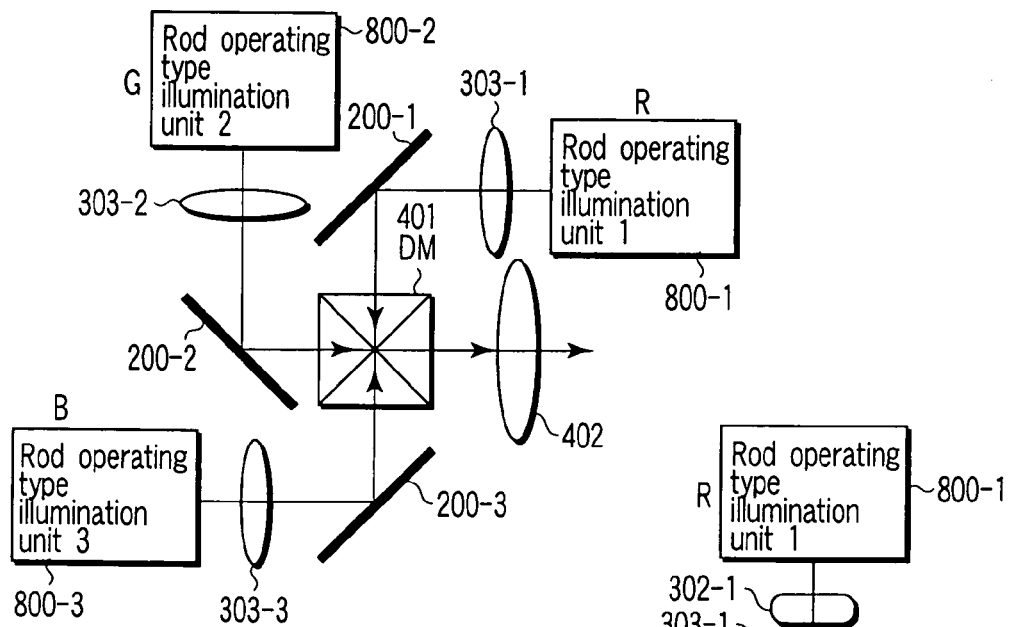
FIG. 30 is a view showing an optical configuration of a projection display apparatus according to an eighth embodiment of the present invention.
Figure 31:
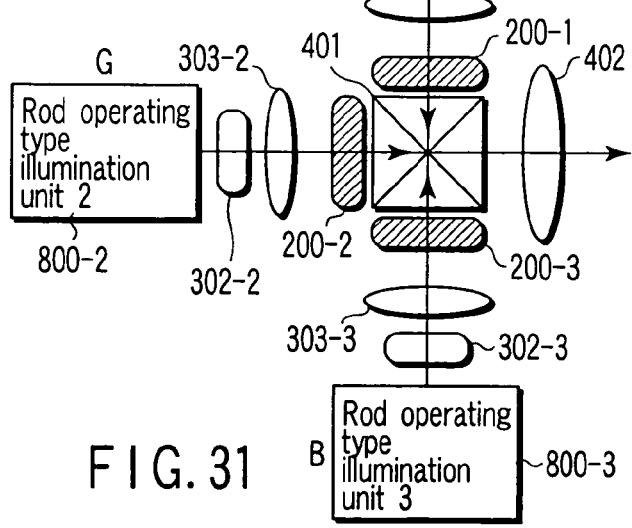
FIG. 31 is a view showing an optical configuration of a modification of the projection display apparatus according to the eighth embodiment.
Figure 32:
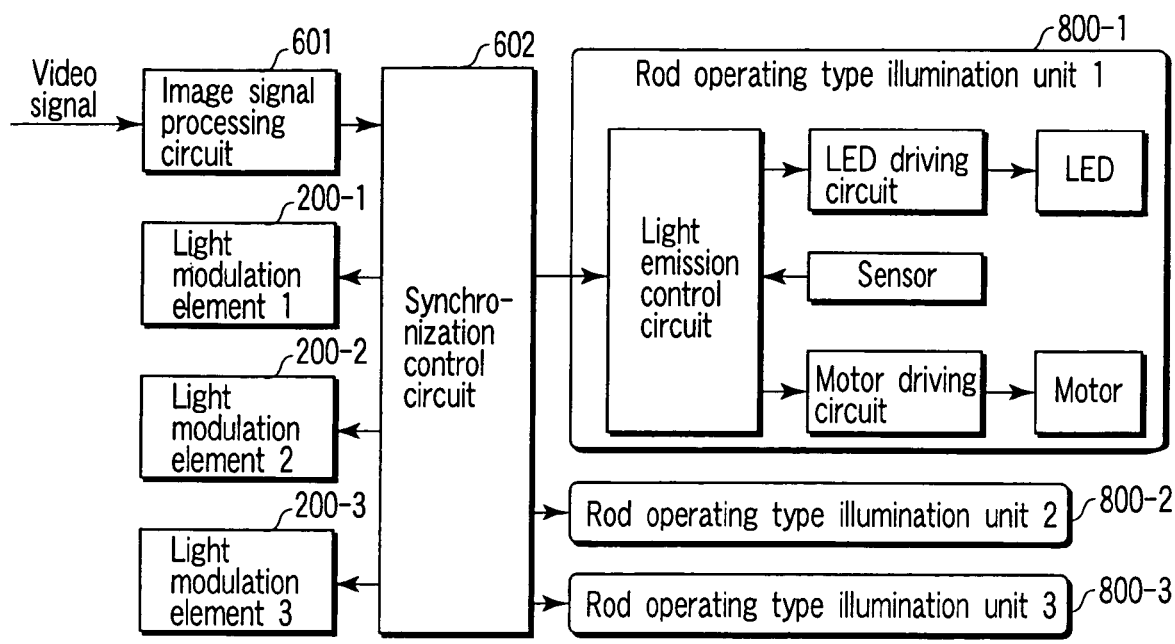
FIG. 32 is a block diagram showing an electrical control system of the projection display apparatus according to the eighth embodiment.

FIGS. 30 and 31 are views showing an optical configuration of the projection display apparatus according to the eighth embodiment. Furthermore, FIG. 32 is a block diagram showing an electrical control system of the projection display apparatus according to this embodiment, and FIG. 33 is a view showing driving timings of each rod operating type illumination unit.

Figure 33:
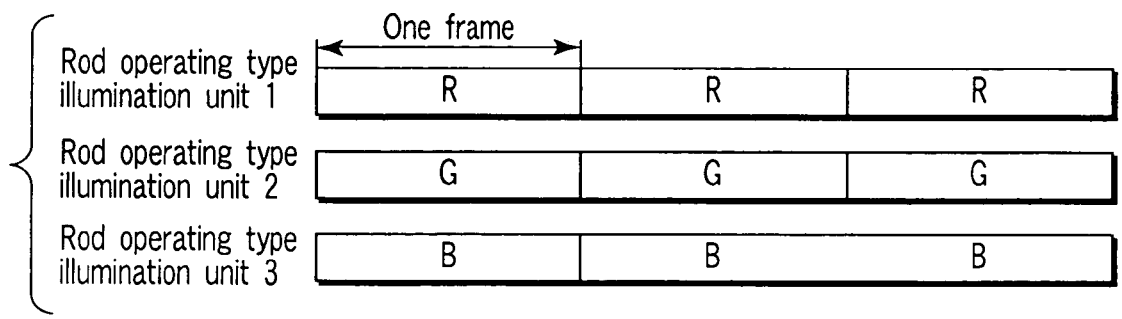
FIG. 33 is a view showing driving timings of respective rod operating type illumination units.

That is, in the configuration depicted in FIG. 30, a first rod operating type illumination unit (a rod operating type illumination unit "1") 800-1 is configured to always project light R as shown in FIG. 33. A first light modulation element (a DMD "1") 200-1 is irradiated with the light R exiting from this first rod operating type illumination unit 800-1 through a lens 303-1. Moreover, as shown in FIG. 33, light G exiting from a second rod operating type illumination unit (a rod operating type illumination unit "2") which always projects the light G is applied to a second light modulation element (a DMD "2") 200-2 through a lens 303-2. As shown in FIG. 33, light B exiting from a third rod operating type illumination unit (a rod operating type illumination unit "3") 800-3 which always projects the light B is applied to a third light modulation element (a DMD "3") 200-3 through a lens 303-3. Additionally, the light beams modulated by the first to third light modulation elements 200-1 to 200-3 are combined by a DM 401, and the combined light is led to a projection lens 402.

Additionally, in the configuration shown in FIG. 31, light R exiting from a first rod operating type illumination unit (a rod operating type illumination unit "1") 800-1 which always projects the light R is applied to a first light modulation element (an LCD "1") 200-1 through a polarization conversion element 302-1 and a lens 303-1. Light G exiting from a second rod operating type illumination unit (a rod operating type illumination unit "2") 800-2 which always projects the light G is applied to a second light modulation element (an LCD "2") 200-2 through a polarization conversion element 302-2 and a lens 303-2. Light B exiting from a third rod operating type illumination unit (a rod operating type illumination unit "3") 800-3 which always projects the light B is applied to a third light modulation element (an LCD "3") 200-3 through a polarization conversion element 302-3 and a lens 303-3. Further, the light beams modulated by the first to third light modulation elements 200-1 to 200-3 are combined by a DM 401, and the combined light is led to a projection lens 402.

It is to be noted that synchronization of the three light modulation elements 200-1, 200-2 and 200-3 is required in this embodiment, the rod operating type illumination units 800-1, 800-2 and 800-3 may not be synchronized since each of these units constantly performs irradiation of a single color. Therefore, the configuration of the synchronization control circuit 602 becomes simpler than those of the foregoing embodiments.

Ninth Embodiment

A projection display apparatus according to a ninth embodiment of the present invention will now be described. As the input color video signal, there is a signal having four or more colors in addition to a signal having colors R, G and B.

Figure 34:
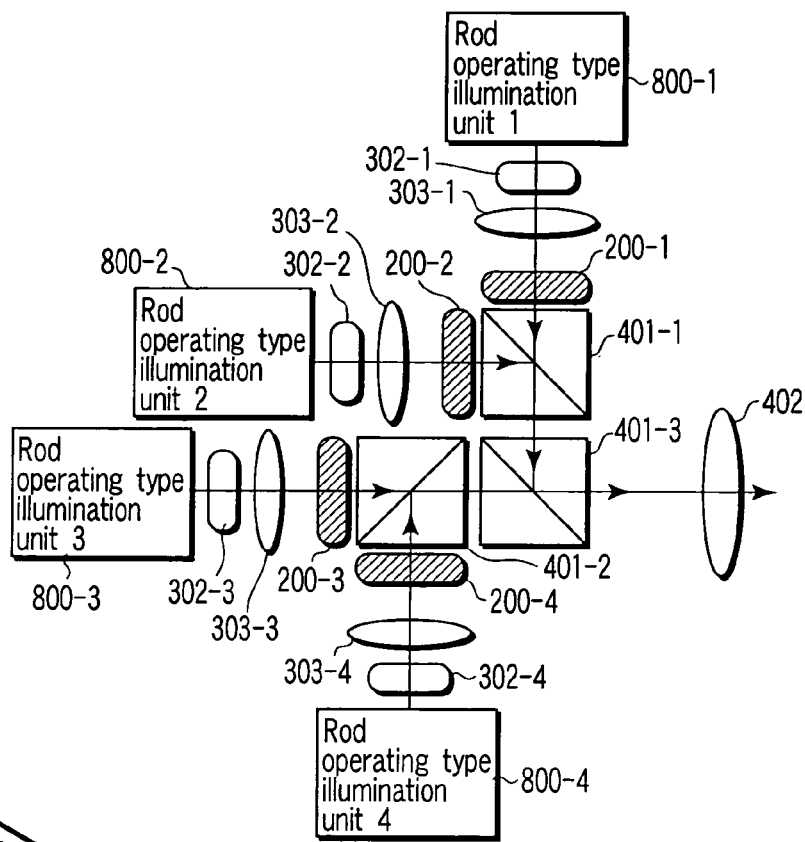
FIG. 34 is a view showing an optical configuration of a projection display apparatus according to a ninth embodiment of the present invention.

A high-color-reproduction color projection display apparatus compatible with a video signal having such a signal of four colors has such an optical configuration as shown in FIG. 34. That is, a first light in the four colors exiting from a first rod operating type illumination unit (a rod operating type illumination unit "1") 800-1 which constantly projects the first light is applied to a first light modulation element (an LCD "1") 200-1 through a polarization conversion element 302-1 and a lens 303-1. A second light in the four colors exiting from a second rod type operating illumination unit (a rod operating type illumination unit "2") 800-2 which constantly projects the second light is applied to a second light modulation element (an LCD "2") 200-2 through a polarization conversion element 302-2 and a lens 303-2. Further, a third light in the four colors exiting from a third rod operating type illumination unit (a rod operating type illumination unit "3") 800-3 which constantly projects the third light is applied to a third light modulation element (an LCD "3") 200-3 through a polarization conversion element 302-3 and a lens 303-3. A fourth light in the four colors exiting from a fourth rod operating type illumination unit (a rod operating type illumination unit "4") 800-4 which constantly projects the fourth light is applied to a fourth light modulation element (an LCD "4") 200-4 through a polarization conversion element 302-4 and a lens 303-4. Furthermore, the light beams modulated by the first to fourth light modulation elements 200-1 to 200-4 are combined by a DM 401, and the combined light is led to a projection lens 402.

Figure 35:
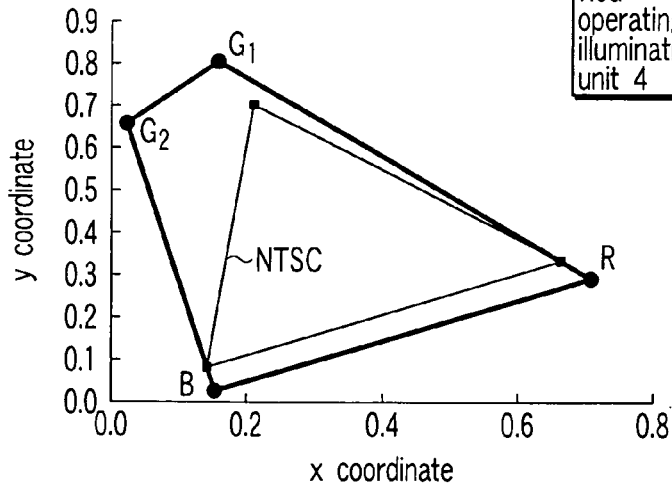
FIG. 35 is a chromaticity diagram showing a chromaticity coordinate of an LED of each color used in each rod operating type illumination unit and an area of a color which can be reproduced when the configuration of the projection display apparatus according to the ninth embodiment is utilized and the number of G-based colors is two.

Incidentally, according to the projection display apparatus using the four illumination units, for example, as shown in FIG. 35, a color reproduction area can be enlarged by preparing two G-based colors and forming a square area.

Figure 36:
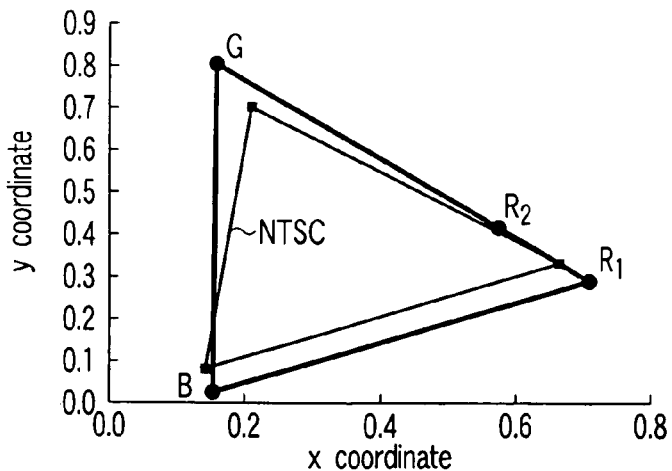
FIG. 36 is a chromaticity diagram showing a chromaticity coordinate of an LED of each color used in each rod operating type illumination unit and an area of a color which can be reproduced when the configuration of the projection display apparatus according to the ninth embodiment is utilized and the number of R-based colors is two.

Alternatively, as shown in FIG. 36, an application which uses two R-based colors and enables subtle color reproduction of the red color can be also considered. This application can obtain a subtle color which can be represented by a bit number close to 16 bits with respect to a color signal represented by eight bits, for example. The present invention becomes particularly effective as a display apparatus for a medical use by enabling reproduction of a subtle color in a red color area in this manner.

It is also possible to easily cope with color video signals of five or more colors by increasing the number of the illumination units.

Tenth Embodiment

A projection display apparatus according to a tenth embodiment of the present invention will now be described. This embodiment is a projection display apparatus using a rod operating type illumination unit which subtly changes a luminous color even in case of a monochromatic light.

Figure 37:
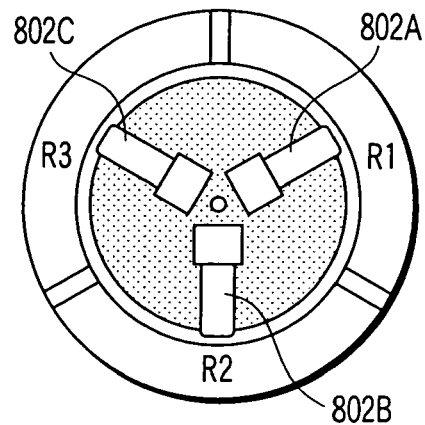
FIG. 37 is a view showing a relationship between an arrangement of LEDs and light leading rod members in a rod operating type illumination unit which is used in a projection display apparatus according to a tenth embodiment of the present invention.

That is, as shown in FIG. 37, this embodiment has three light leading rod members 802A, 802B and 802C, and LEDs having three types of red colors (R1, R2 and R3) whose emission wavelengths are different from each other are arranged. In this example, it is possible to determine that R1 has 625 nm, R2 has 630 nm and R3 has 635 nm, for example.

When the rod operating type illumination unit is driven, light beams exiting from three light leading rod members 802A, 802B and 802C which rotationally move become time-series R1, R2 and R3 in the respective light leading rod members. Further, a combined light of the three light leading rod members is in a state where R1, R2 and R3 of three colors are respectively constantly on. Therefore, the combined light has a luminous color formed of a plurality of wavelengths, and a luminous color of a red illumination light can be subtly adjusted as different from a luminous color of an LED having a single wavelength.

The luminous color of the R color of the combined light can be changed by selecting wavelengths of the respective LEDs used, and also adjusted by a scheme which controls a driving current in accordance with each LED having each wavelength or a scheme which changes a ratio of the number of R1, R2 and R3.

Furthermore, luminous colors of green and blue illumination light can be likewise adjusted.

Eleventh Embodiment

A projection display apparatus according to an eleventh embodiment of the present invention will now be described.

Figure 38:
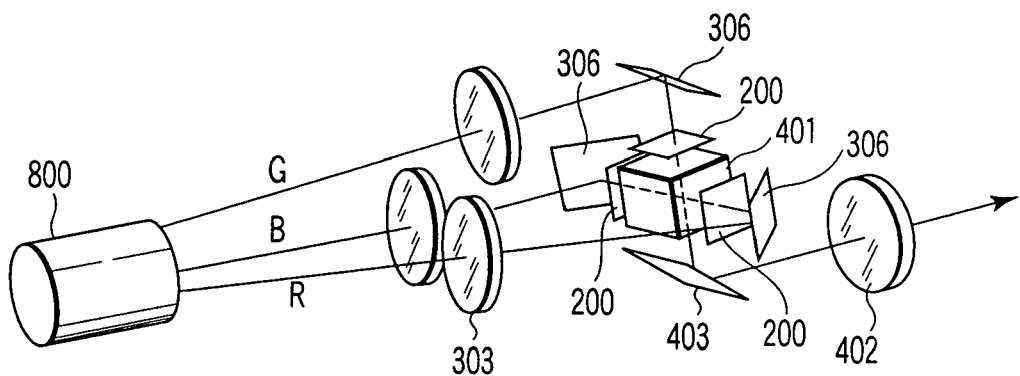
FIG. 38 is a view showing an optical configuration of a projection display apparatus according to an eleventh embodiment of the present invention.

As shown in FIG. 38, the projection display apparatus according to this embodiment uses a rod operating type illumination unit 800 which can divide and project light fluxes of R, G and B, and light modulation elements 200 for respective colors are irradiated with the light fluxes of R, G and B exiting from the rod operating type illumination unit 800 as illumination light beams by lenses 303 and mirrors 306 as different illumination optical systems. Moreover, the light beams modulated by these light modulation elements 200 are combined by a DM 401, and the combined light is lead to a projection lens 402 through a mirror 403.

With such a configuration, light fluxes of the illumination unit which emits a plurality of colors can be divided in accordance with each color without using an expensive color separation unit, and the different light modulation elements can be illuminated with the separated light fluxes, thereby inexpensively constituting the projection display apparatus with the light utilization efficiency.

Figure 39A:
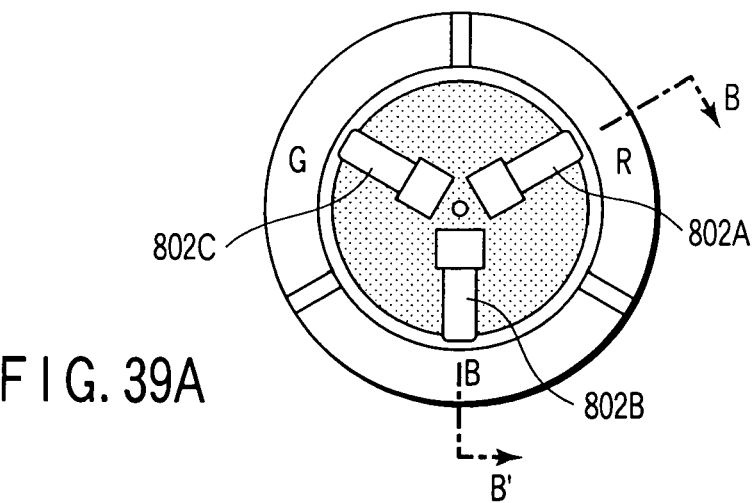
FIG. 39A is a view showing a relationship between an arrangement of LEDs and light leading rod members in a rod operating type illumination unit used in the projection display apparatus according to the eleventh embodiment.

It is to be noted that, as shown in FIG. 39A, the rod operating type illumination unit 800 which can divide and project the light fluxes of R, G and B has LEDs for R, G and B respectively collectively arranged on parts each corresponding to an approximately ⅓ circumference and three light leading rod members (a light leading rod member "A" 802A, a light leading rod member "B" 802B and a light leading rod member "C" 802C). Although the luminous colors of the light exiting from the three rotating light leading rod members are switched in time series, the light fluxes from the rod operating type illumination unit exit in a state where light flux areas of R, G and B are fixed in accordance with the arrangement of the LEDs of R, G and B.

Figure 39C:
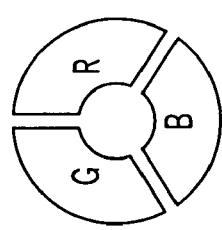
FIG. 39C is a view schematically showing a shape of an exiting light flux taken along a line CC' depicted in FIG. 39B.
Figure 39D:
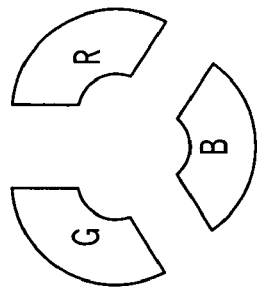
FIG. 39D is a view schematically showing an exiting light flux taken along a line DD' depicted in FIG. 39B.
Figure 39B:
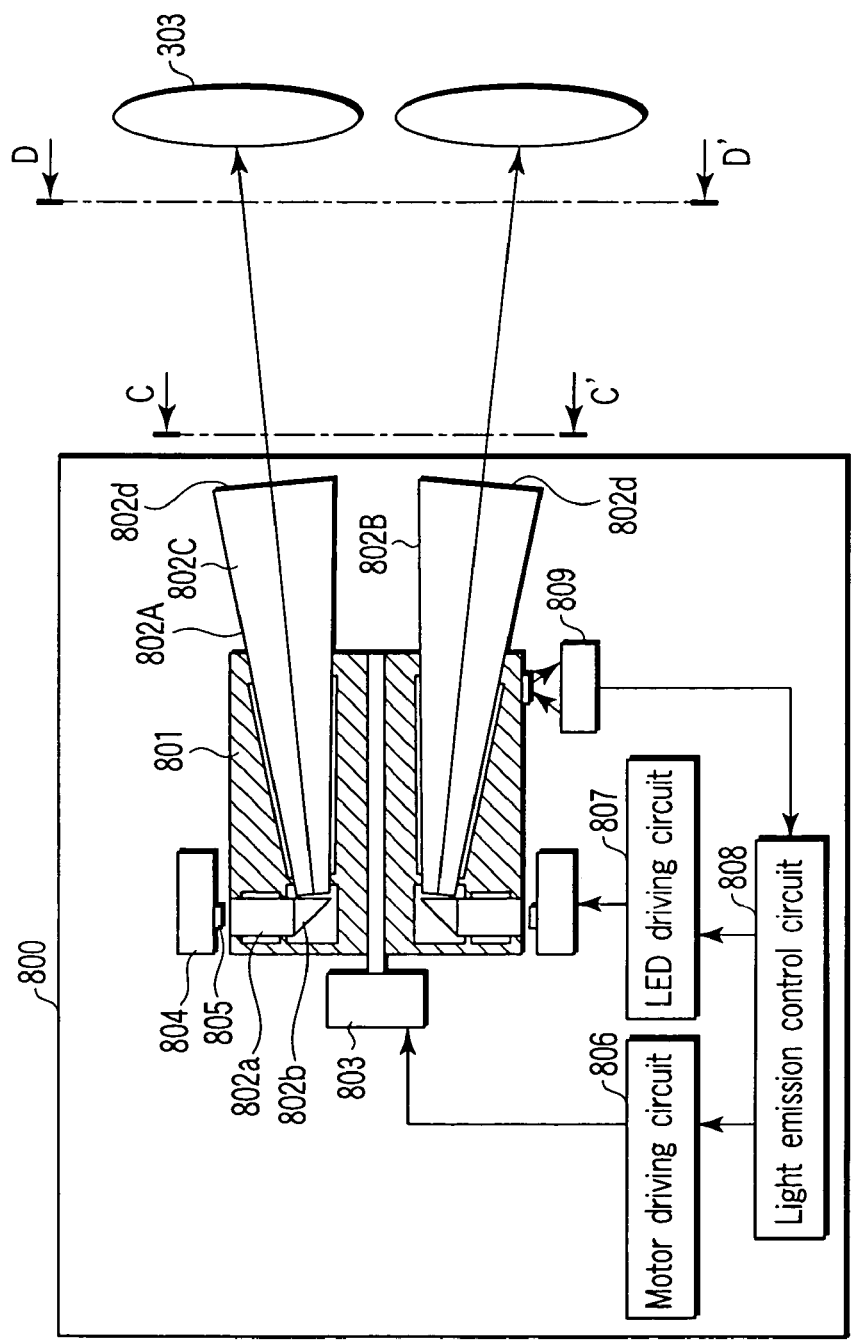
FIG. 39B is a cross-sectional view taken along a line BB' depicted in FIG. 39A.

In this case, as shown in FIG. 39B which is a cross-sectional line taken along a line BB' of FIG. 39A, tapered rods 802c of the respective light leading rod members 802A, 802B and 802C are configured to be opened toward the outside. As a result, rough shapes of projected light fluxes seen from a line CC' and a line DD' are as shown in FIGS. 39C and 39D. That is, the light flux is divided as distanced from a projection end surface 802d of each light leading rod member.

Although the above has described the present invention based on the embodiments, the present invention is not restricted to the foregoing embodiments, and various modifications or applications can be carried out within the scope of the present invention.

For example, although the motor as a movable portion corresponding to movable means is included in each illumination unit in, e.g., the fourth, fifth and sixth embodiments using the plurality of illumination units, the light leading members of the plurality of illumination units can be operated by using, e.g., a gear or a belt even if the number of the movable portion (the motor) is one.

Moreover, even if the number of the light emission control circuit is one, control over LED driving timings of the plurality of illumination units and control over an operation of the motor can be executed by wire-connecting each illumination unit and a control line.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A projection display apparatus comprising:
a plurality of luminous bodies;
a luminous body driving portion configured to drive and turn on each of the plurality of luminous bodies;
a plurality of light leading members configured to optically separately lead and project light beams exiting from the plurality of luminous bodies which are turned on by the luminous body driving portion;
a movable portion configured to enable relative movement of the plurality of light leading members and the luminous bodies;
a light selection control portion configured to control at least one of the movable portion and the luminous body driving portion in such a manner that light beams which enter the plurality of light leading members are selected from the light beams exiting from the plurality of luminous bodies;
a light modulation element configured to modulate light in accordance with image data;
an illumination member configured to illuminate the light modulation element with light beams exiting from the plurality of light leading members; and
a display control portion configured to control the light selection control portion and the light modulation element in such a manner that the light modulation element suitable for light beams exiting from the plurality of light leading members is illuminated with the exiting light beams.

2. The projection display apparatus according to claim 1, wherein
the projection display apparatus is equipped with a plurality of illumination units,
in which at least the plurality of luminous bodies and the light leading members are integrally constituted, and
which output the exiting light beams in a predetermined direction.

3. The projection display apparatus according to claim 2, wherein the display control portion controls the light selection control portion in such a manner that light beams simultaneously exiting from the respective light leading members in the plurality of illumination units become light beams of the same color in substantially the same wavelength bands.

4. The projection display apparatus according to claim 3, wherein
the projection display apparatus further comprises a combination portion configured to combine two light fluxes having different polarizing directions into one light flux,
the illumination unit further comprises a polarization converting portion configured to convert light beams from the light leading members into light beams in a polarized state in a predetermined direction, and
light beams of a polarizing direction converted by the polarization converting portion included in one illumination unit in the plurality of illumination units and light beams of a polarizing direction converted by the polarization converting portion included in another illumination unit are converted into the different polarizing directions capable of being combined by the combination portion.

5. The projection display apparatus according to claim 3, wherein
the light beams of the same color in substantially the same wavelength bands exiting from the luminous bodies comprise light beams having a first single wavelength and light beams having a second single wavelength, and the illumination member includes a wavelength selection mirror which transmits the light beams having the first single wavelength exiting from the luminous bodies, and reflects the light beams having the second single wavelength.

6. The projection display apparatus according to claim 5, wherein the display control portion has image converting portion configured to convert image data to be supplied to the light modulation element in accordance with one of a wavelength and an intensity of each of the light beams having the first single wavelength and the light beams having the second single wavelength.

7. The projection display apparatus according to claim 2, wherein the light leading members are configured to rotate by the movable portion and to project light beams having different colors in time series, and the projected light beams having different colors exit from different specific areas of the illumination units.

8. The projection display apparatus according to claim 7, wherein the plurality of illumination members are arranged in accordance with the different specific areas.

9. The projection display apparatus according to claim 1, wherein when the image data comprises three types of image data corresponding to the three colors of red, blue and green, the luminous bodies include a luminous body of a red light, a luminous body of a green light and a luminous body of a blue light.

10. The projection display apparatus according to claim 9, wherein the display control portion controls a modulation state of the light modulation element in accordance with the wavelength of the light beams which are directed to the light modulation element.

11. The projection display apparatus according to claim 1, wherein the light selection control portion controls in such a manner that the light leading members project light beams having different colors in time series.

12. The projection display apparatus according to claim 11, wherein the display control portion controls a modulation state of the light modulation element in accordance with the wavelength of the light beams which are directed to the light modulation element.

13. A projection display apparatus comprising:

a plurality of luminous bodies;

lighting means for driving and turning on each of the plurality of luminous bodies;

a plurality of light leading means for optically separately leading and projecting light beams exiting from the plurality of luminous bodies which are turned on by the lighting means;

movable means for enabling relative movement of the plurality of light leading means and the luminous bodies;

light selection controlling means for controlling at least one of the movable means and the lighting means in such a manner that light beams which enter the plurality of light leading means are selected from the light beams exiting from the plurality of luminous bodies;

a light modulation element which modulates light in accordance with image data;

illuminating means for illuminating the light modulation element with light beams exiting from the plurality of light leading means; and display controlling means for controlling the light selection controlling means and the light modulation element in such a manner that the light modulation element suitable for light beams exiting from the plurality of light leading means is illuminated with the exiting light beams.

* * * * *